United States Patent [19]
Jarchow et al.

[11] Patent Number: 5,011,463
[45] Date of Patent: Apr. 30, 1991

[54] INFINITELY VARIABLE HYDROSTATIC MECHANICAL POWER SHIFT GEAR WITH GROUP SHIFTINGS

[76] Inventors: Friedrich Jarchow, Am Ruhrstein 37, 4300 Essen 1; Peter Tenberge, Nelkenweg 8, 7990 Friedrichshafen, both of Fed. Rep. of Germany

[21] Appl. No.: 414,098

[22] Filed: Sep. 28, 1989

Related U.S. Application Data

[63] Continuation of Ser. No. 160,905, Feb. 26, 1988, abandoned, which is a continuation-in-part of Ser. No. 10,451, Feb. 3, 1987, abandoned, which is a continuation of Ser. No. 842,488, Mar. 21, 1986, abandoned.

[30] Foreign Application Priority Data

Apr. 6, 1985 [DE] Fed. Rep. of Germany ....... 3512523
May 21, 1985 [DE] Fed. Rep. of Germany ....... 3510265
Feb. 19, 1986 [DE] Fed. Rep. of Germany ....... 3605203

[51] Int. Cl.$^5$ ............................................. F16H 47/04
[52] U.S. Cl. ........................................ 475/74; 475/6; 475/78
[58] Field of Search ...................... 475/72, 73, 74, 78, 475/6

[56] References Cited

U.S. PATENT DOCUMENTS

| | | | |
|---|---|---|---|
| 3,455,183 | 7/1969 | Orshansky, Jr. ..................... | 475/78 |
| 3,580,107 | 5/1971 | Orshansky, Jr. ..................... | 475/78 |
| 3,796,111 | 3/1974 | Schauer ............................ | 475/74 X |
| 4,259,881 | 7/1981 | Meyerle ............................ | 475/72 |
| 4,354,400 | 10/1982 | Baker ............................... | 475/74 |

Primary Examiner—Dwight Diehl
Attorney, Agent, or Firm—Price, Heneveld, Cooper, DeWitt & Litton

[57] ABSTRACT

The gear consists of a four-shaft epicyclic gear, of which one shaft forms the input shaft which is in connection via an infinitely variable hydrostatic gear with the second shaft and of which the two remaining shafts represent connecting shafts which, in an extreme position of the hydrostatic gear, have the same speeds and behave during adjustment of the hydrostatic gear into the other extreme position in such a way that one becomes constantly slower and the other constantly faster, and which alternately act on the output shaft via gears of a gear group with following group shiftings. What is special is that the group shiftings make possible a multiple utilization of the gears of the gear group and that preparatory shifts for changing the group shifting provide the synchronization of idling gear parts, and that each gear change itself takes place at synchronous speeds, free from load and without tractive force interruption. Such gears require only small hydrostatic gears, have a particularly large transmission control range and favorable efficiencies. Its use in motor vehicles results in fuel savings and a superior acceleration behavior.

16 Claims, 19 Drawing Sheets

INFINITELY VARIABLE HYDROSTATIC MECHANICAL POWER SHIFT GEAR WITH GROUP SHIFTINGS

This is a continuation of co-pending application Ser. No. 160,905, filed 2/26/88, now abandoned, which is a continuation-in-part of U.S. Pat. Ser. No. 07/010,451, now abandoned which is a continuation of U.S. Pat. Ser. No. 06/842,488 now abandoned.

BACKGROUND OF THE INVENTION

Gears according to the present invention are suitable for vehicles. They have a relatively large infinitely variable transmission control range and therefore allow operation of the internal combustion engine along a preferential characteristic in the family of characteristic curves. This may be, for example, the line of minimum fuel consumption or else a line for a good acceleration behavior. As such gears also have relatively good efficiencies, fuel can be saved. As there is no tractive force interruption, they also have a superior acceleration behavior. Their automatic operating principle contributes to the comfort of driving. The gear according to German Patent Specification 3,147,447 C2 or according to European Patent Specification 0,081,696 comes closest to the present invention.

SUMMARY OF THE INVENTION

The invention pertains to an infinitely variable hydrostatic mechanical power shift gear with group shiftings. The gear includes a four-shaft epicycle gear, in which one shaft forms the input shaft which in turn is connected to a second shaft via an infinitely variable hydrostatic gear. The two remaining shafts function as connecting shafts responsive to the changes in the hydrostatic gear such that their speeds change as the hydrostatic gear is adjusted. The connecting shafts cooperate with a plurality of gear wheels, which form a gear group. The gears are alternatively engaged at synchronous speeds and at no load during operation. A group shifting mechanism is included to not only cooperate with the gear group to transfer the power to the output shaft, but also to enable multiple utilization of the same gear wheels to create a plurality of gear groups. Every shifting of gears occurs without tractive force interruption.

The apparatus of the present invention, then, increases greatly the number of gears available with such a apparatus without the enormous increase in complexity, size and weight heretofore required. Moreover, by reducing the individual rangeability of each gear, one is able to utilize a smaller hydrostatic gear. Such a modification not only reduces the weight and overall size of the apparatus, but also increases the efficiency of the hydrostatic mechanical power shift gear.

DETAILED DESCRIPTION OF THE PREFERRED EMBODIMENT

The apparatus disclosed in German Patent 3,147,447 C2 (or European Patent 0,087,696) is the closest to the present invention. In the first embodiment, the gear group construction is similar to that of the above mentioned patents. Hence, for ease of understanding, the German Patent 3,147,447 C2 will be first described in connection with FIGS. 1–7.

Figure 1:
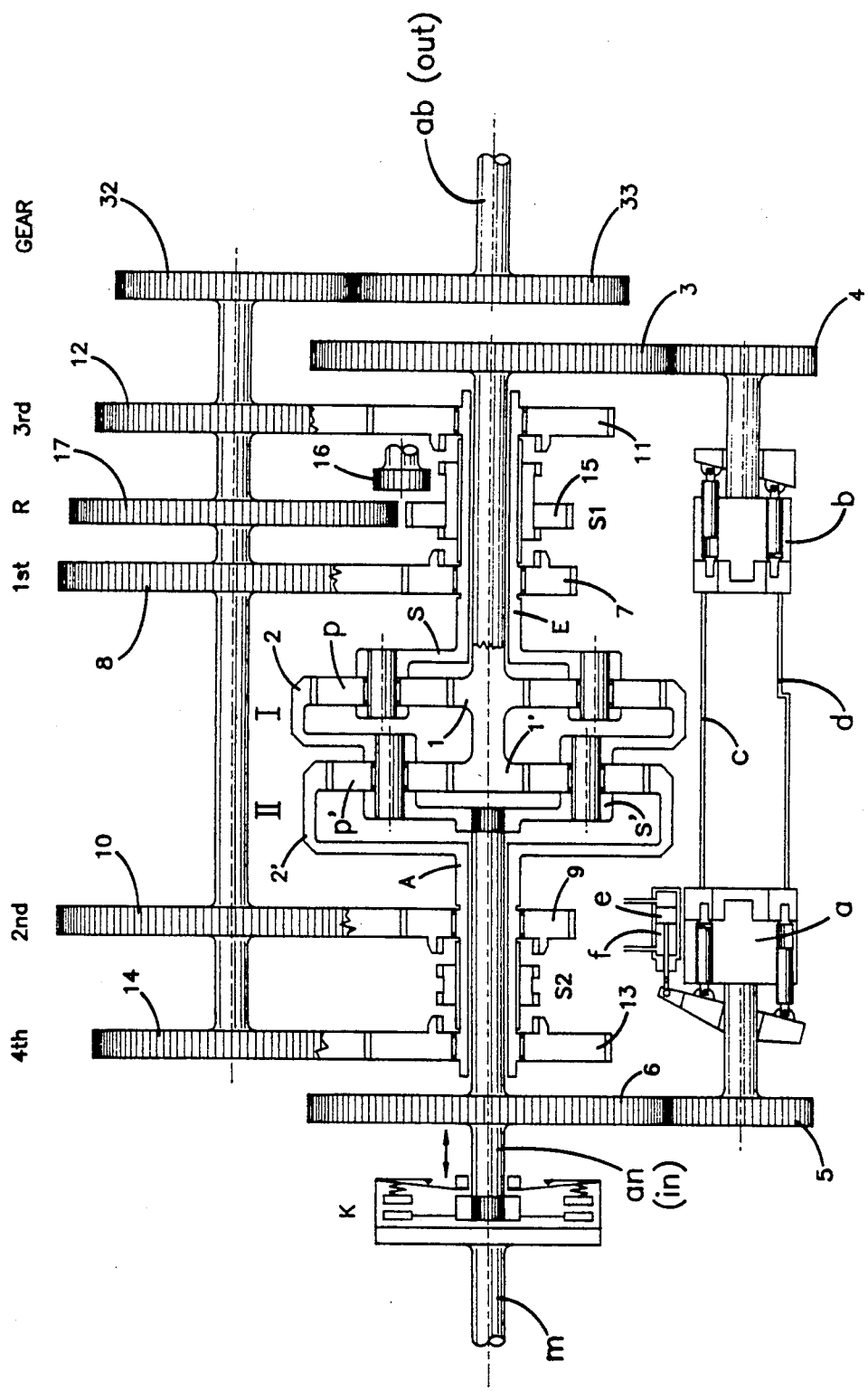
FIG. 1 is an illustration of a prior art apparatus.

FIG. 1 shows the planetary gear I comprising sun gear 1, ring gear 2 and the planet carrier s, in which a number of planet gears p are borne, distributed around the periphery. Associated with planetary gear II are sun gear 1', ring gear 2' and planet carrier s', in which a number of planet gears p' are likewise borne, distributed evenly around the periphery. In the two planetary gears I and II, sun gears 1 and 1' are solidly interconnected. Also, ring gear 2 and planet carrier s' are solidly interconnected.

The ring gear 2 and the planet carrier s' are fixedly connected to the input shaft "in" of the gear. The sun gears 1, 1' are in connection via the gear wheels 3,4 with a swash plate axial piston displacer b; and the input shaft is in connection by the gear wheels 6, 5 with a swash plate axial piston displacer a. The transmission between the wheels 3, 4 is the same as the transmission between the wheels 6, 5. The oil lines c and d connect the two displacers a, b to a hydrostatic gear. The swash plate of the displacer a can be swung by means of oil pressure via the piston e, which is guided in the cylinder f. As a result, the displacement volume of the displacer a changes. The displacement volume of the displacer b is constant. In terms of the amount, it is of the same magnitude as that of the displacer a in the extreme position of the swash plate. If the swash plate of the displacer a is perpendicular to the axis of the wheel 5, its displacement volume is zero. The displacer a is then unable to deliver or take in any oil. As a result, the displacer b with the wheels 4, 3, 1, 1' remains stationary and supports its torque via an oil column. When the swash plate of the displacer a passes through zero, the displacer b reverses its direction of rotation. When the swash plate swings through, the transmission $i_{ba}$ of the hydrostatic gear, i.e. the ratio of the speeds n of the displacers b and a, changes from $i_{ba} = n_b/n_a = 1$ to $-1$.

The shaft associated with planet carrier s of the planetary gear I is referred to as connecting shaft E, and the shaft associated with the ring gear 2' is referred to as connecting shaft A. The output shaft "out" of the gear can be connected to the connecting shaft E via the spur gear stage with the wheels 7 and 8 or via the spur gear stage with the wheels 11 and 12, or to the connecting shaft A via the spur gear stage with the wheels 9 and 10 or via the spur gear stage with the wheels 13 and 14. The wheels: 7, 8 form the first gear; 9, 10 the second gear; 11, 12 the third gear; and 13, 14 the fourth gear. The transmissions of the first and second gears are the same, as are the transmissions of the third and fourth gears. The double toothed clutch S1 shifts the first or third gear and the double toothed clutch S2 shifts the second or fourth gear. The reverse gear R is realized via the wheels 15, 16 and 17. Wheel 15 is on the sliding sleeve of the clutch S1. Engagement of the reverse gear is carried out by axial displacement of the idler gear 16. In FIG. 1, it is disengaged. The clutches S1 and S2 are also in neutral position in FIG. 1.

The wheels 32 and 33 ensure a coaxial position of input shaft "in" and output shaft "out".

Starting is carried out with the friction clutch K. It connects the engine crankshaft m to the gear input shaft "in".

Figure 2:
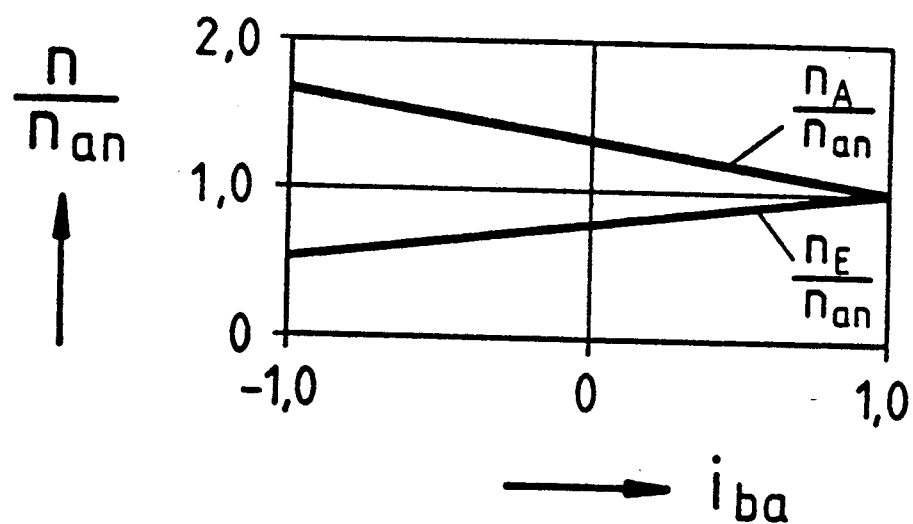
FIG. 2 is a graph which shows the profile of the speeds related to the input shaft speed of the connecting shafts as a function of the transmission of the hydrostatic gear.

FIG. 2 shows the profile of the speeds related to the input shaft speed $n_{an}$, $n_E/n_{an}$ and $n_A/n_{an}$, of the connecting shafts E and A as a function of the transmission $i_{ba}$ of the gear.

When starting with friction clutch K, first gear is engaged. The transmission of the hydrostatic gear then becomes $i_{ba} = -1$, i.e. the two displacers rotate oppositely, but at the same speed. The swash plate of the displacer a is in the extreme position for this, which is opposite to that drawn in FIG. 1.

After completing the starting operation by means of friction clutch K, the swash plate is moved to the other extreme position. The transmission $i_{ba}$ then increases. The connecting shaft E turns faster and the connecting shaft A turns slower. At $i_{ba} = 1$, i.e. in the extreme position of the swash plate in accordance with FIG. 1, both connecting shafts have the same speeds. The two planetary gears I and II circulate in this state as clutch. Their shafts then all have the same speed. When not in this clutch state, i.e. with $i_{ab} < 1$, the connecting shaft E runs slower than the connecting shaft A.

During starting and in first gear, the connecting shaft E passes the power to be carried through to the gear output shaft "out". The connecting shaft A idles with it. At the coupling point, i.e. at $i_{ab} = 1$, the second gear, which has the same transmission as the first gear, is engaged load-free at synchronous speeds. By swinging back the swash plate, i.e. by reducing $i_{ba}$, for a moment both gears take over the load. The differential pressure in the hydrostatic gear returns to zero, before increasing again, the high-pressure and low-pressure sides being exchanged. The reincrease in the hydrostatic differential pressure leads to relief of the first gear until the applied shifting force separates it virtually load-free.

After the gear change, the connecting shaft A then passes the power to the output, while the connecting shaft E idles with it. The speed of the connecting shaft A increases and that of the connecting shaft E decreases. In the state $i_{ba} = -1$, a shift is made to the third gear, which has the same transmission as the fourth gear. As the transmissions of the first and second gears and of the third and fourth gears behave like the ratio of the maximum speed of the connecting shaft A to the minimum speed of the connecting shaft E, the change from second gear to third gear again takes place at synchronous speeds, namely in the same way as the change from first gear to second gear.

Passing through third gear and changing to fourth gear takes place analogously to operation with first gear and second gear.

Shifting down is carried out in a corresponding way to shifting up.

The relationships necessary for design of the gear are given below.

Using designations where:

| | |
|---|---|
| $i_{an\text{-}ab}$ | is transmission between input shaft "in" and output shaft "out" |
| $i_{an\text{-}ab\text{-}max}$ | is maximum transmission between input shaft "in" and output shaft "out" |
| $i_{an\text{-}ab\text{-}min}$ | is minimum transmission between input shaft "in" and output shaft "out" |
| $i_{an\text{-}E}$ | is transmission between input shaft "in" and connecting shaft E |
| $i_{an\text{-}A}$ | is transmission between input shaft "in" and connecting shaft A |
| q | is the number of gears |
| $n_A$ | is the speed of the connecting shaft A |
| $n_E$ | is the speed of the connecting shaft E |
| $z_2$ | is the number of teeth of the ring gear of the planetary gear I |
| $z_1$ | is the number of teeth of the sun gear of the planetary gear I |
| $z_{2'}$ | is the number of teeth of the ring gear of the planetary gear II |
| $z_{1'}$ | is the number of teeth of the sun gear of the planetary gear II |
| $P_h$ | is the hydrostatic power flow |
| $P_{GW}$ | is the sliding-rolling power flow in the gear teeth of the planetary gears I and II |
| $P_{an}$ | is the input power |
| $\Delta_p$ | is the differential pressure in the hydrostatic circuit |

The overall rangeability which characterizes the control range from $i_{an\text{-}ab\text{-}max}$ to $i_{an\text{-}ab\text{-}min}$ in which the maximum engine power can be transmitted becomes:

$$\phi_g = \frac{i_{an-ab-max}}{i_{an-ab-min}}$$

furthermore the individual rangeability becomes:

$$\phi \sqrt[q]{\phi_g} = \frac{n_{Emax}}{n_{Emin}} = \frac{n_{Amax}}{n_{Amin}}$$

the static transmission in planetary gear I becomes:

$$i_{oI} = \frac{z_2}{z_1} = -\frac{\phi + 1}{\phi - 1}$$

the static transmission in planetary gear II becomes:

$$i_{oII} = \frac{z_{2'}}{z_{1'}} = -\frac{2}{\phi - 1} = i_{oI} + 1$$

the transmission of first gear and second gear becomes:

$$i_1 = i_2 = i_{an\text{-}ab\text{-}max}/\phi$$

the transmission of third gear and fourth gear becomes:

$$i_3 = i_4 = i_1/\phi^2$$

as well as:
  with power-carrying connecting shaft E $$\frac{P_h}{P_{an}} = 1 - \frac{\phi + 1}{2\phi} i_{an-E}$$

$$\frac{P_{GW}}{P_{an}} = \frac{\phi + 1}{2\phi} (i_{an-E} - 1)$$

$$\frac{\Delta p}{\Delta p_{max}} = \frac{i_{an-E}}{\phi}$$

with power-carrying connecting shaft A $$\frac{P_h}{P_{an}} = 1 - \frac{\phi + 1}{2} i_{an-A}$$

$$\frac{P_{GW}}{P_{an}} = i_{an-A} - 1$$

$$\frac{\Delta p}{\Delta p_{max}} = - i_{an-A}$$

and furthermore:

$$\left| \frac{P_h}{P_{an}} \right|_{max} = \frac{\phi - 1}{2}$$

Figure 3:
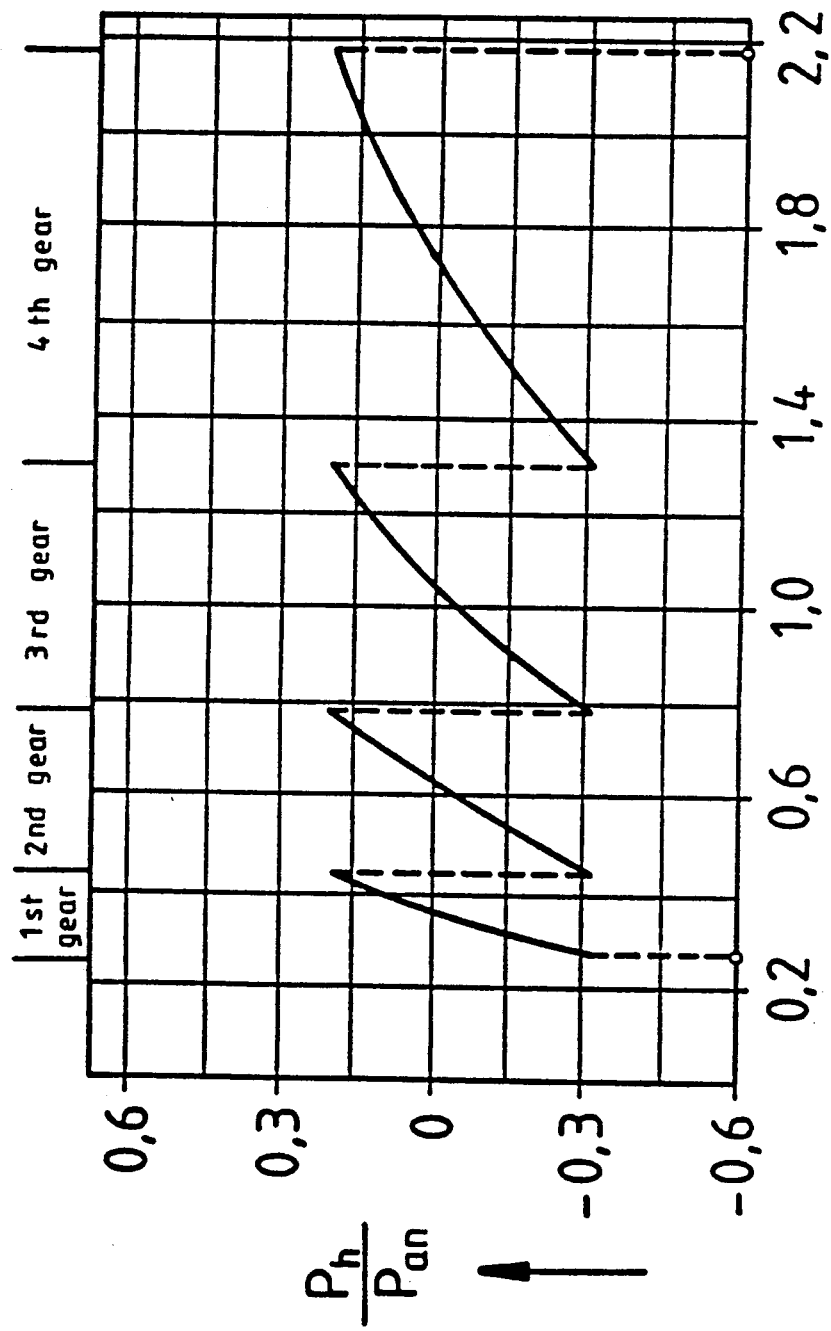
FIG. 3 is a graph which shows a profile of the hydrostatic power related to the input power as a function of the transmission of the complete gear.
Figure 4:
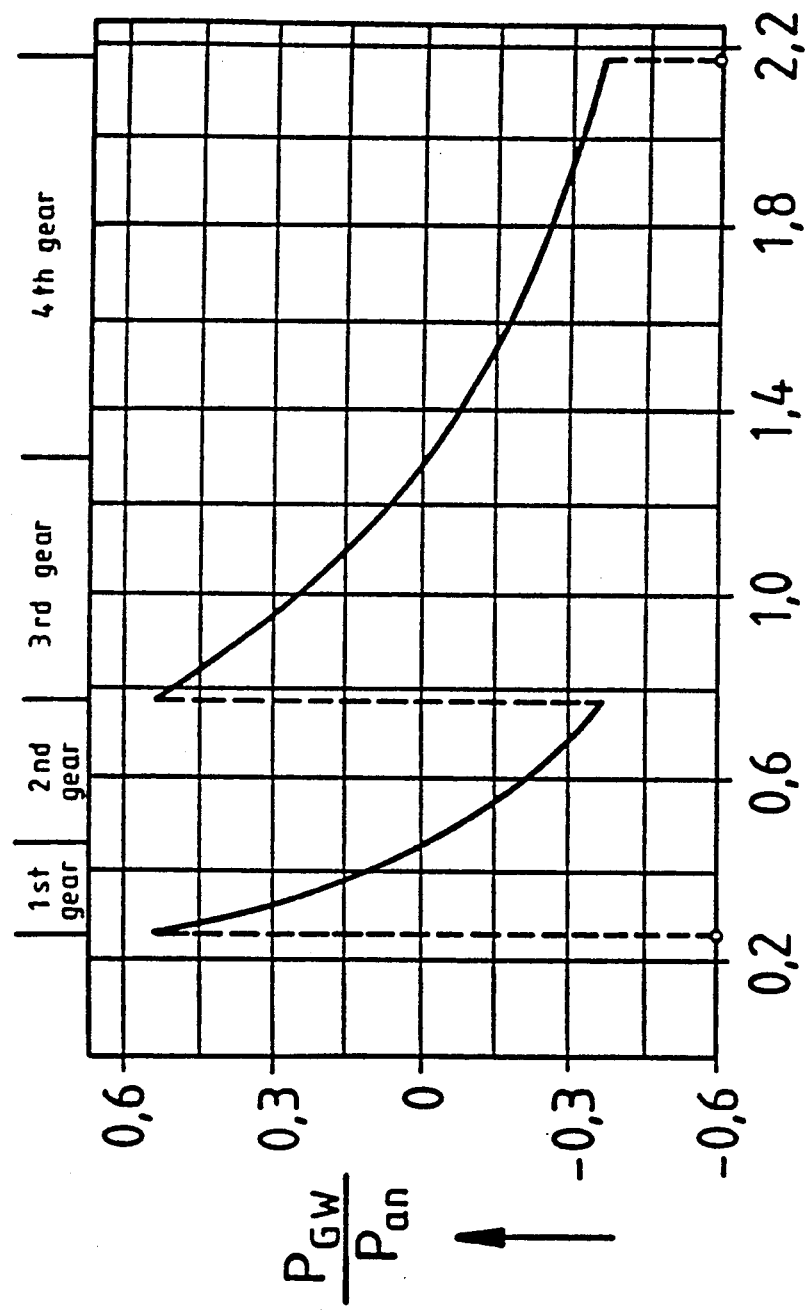
FIG. 4 is a graph which shows the profile of the sliding-rolling power flow in the gear teeth of the planetary gears related to the input power as a function of the transmission of the complete gear.
Figure 5:
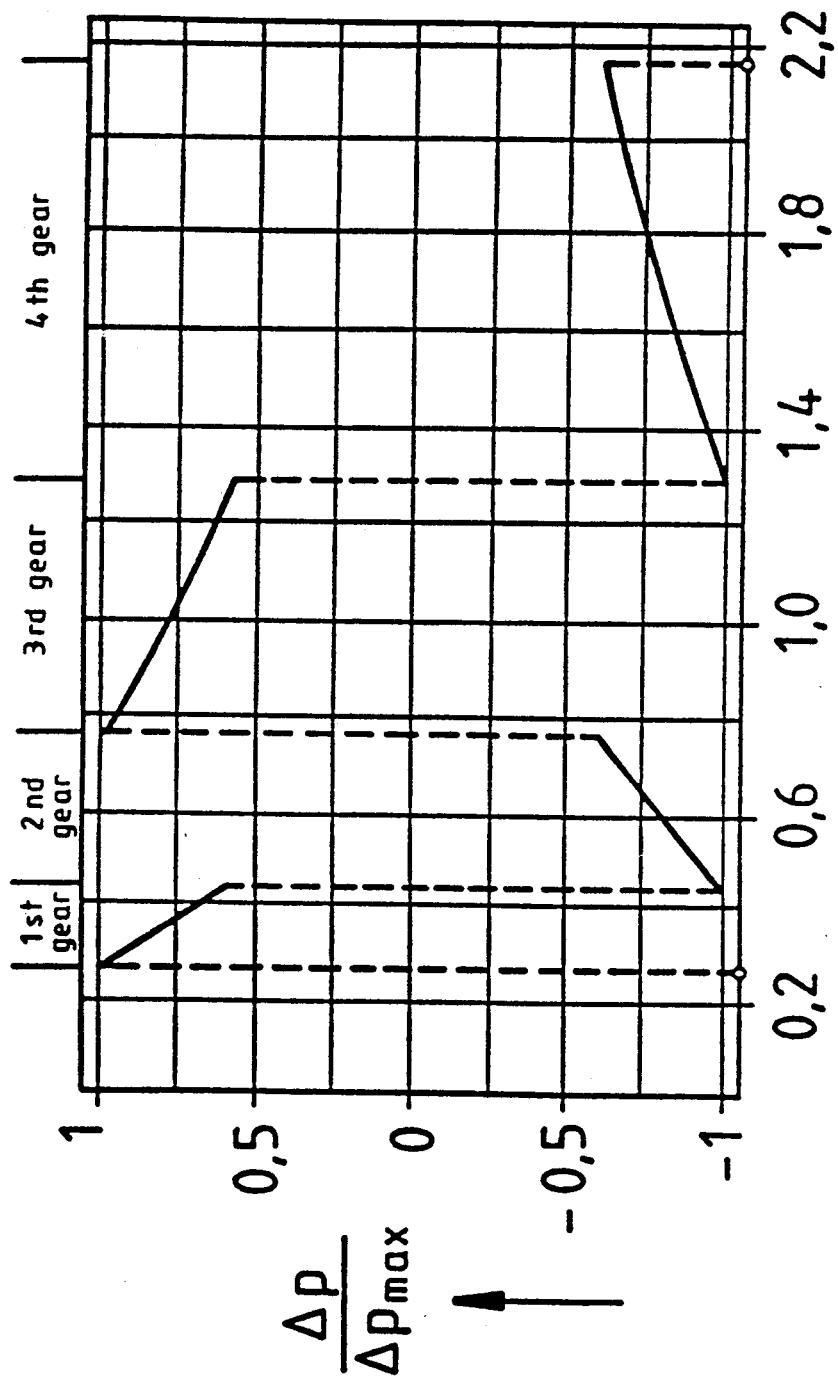
FIG. 5 is a graph which shows the profile of the differential pressure in the hydrostatic circuit related to the maximum differential pressure as a function of the transmission of the complete gear.

For an example with $i_{an\text{-}ab\text{-}max}=3.71$ and $i_{an\text{-}ab\text{-}min}=0.466$ and 4 gears, FIG. 3 shows the profile of $P_h/P_{an}$, FIG. 4 the profile of $P_{GW}/P_{an}$ and FIG. 5 the profile of $\Delta p/\Delta p_{max}$.

Starting with the friction clutch K offers the advantage that the hydrostatic displacers a, b can be designed relatively small. The Patent Specifications U.S. Pat. No. 3,888,139 and U.S. Pat. No. 3,580,107 accredited in the already mentioned Patent Specifications DE 3,147,447 C2 and EP 0,081,696 describe hydrostatic mechanical power shift gears in which starting is performed with the hydrostatic gear. These gears are therefore of relatively large design.

Figure 6:
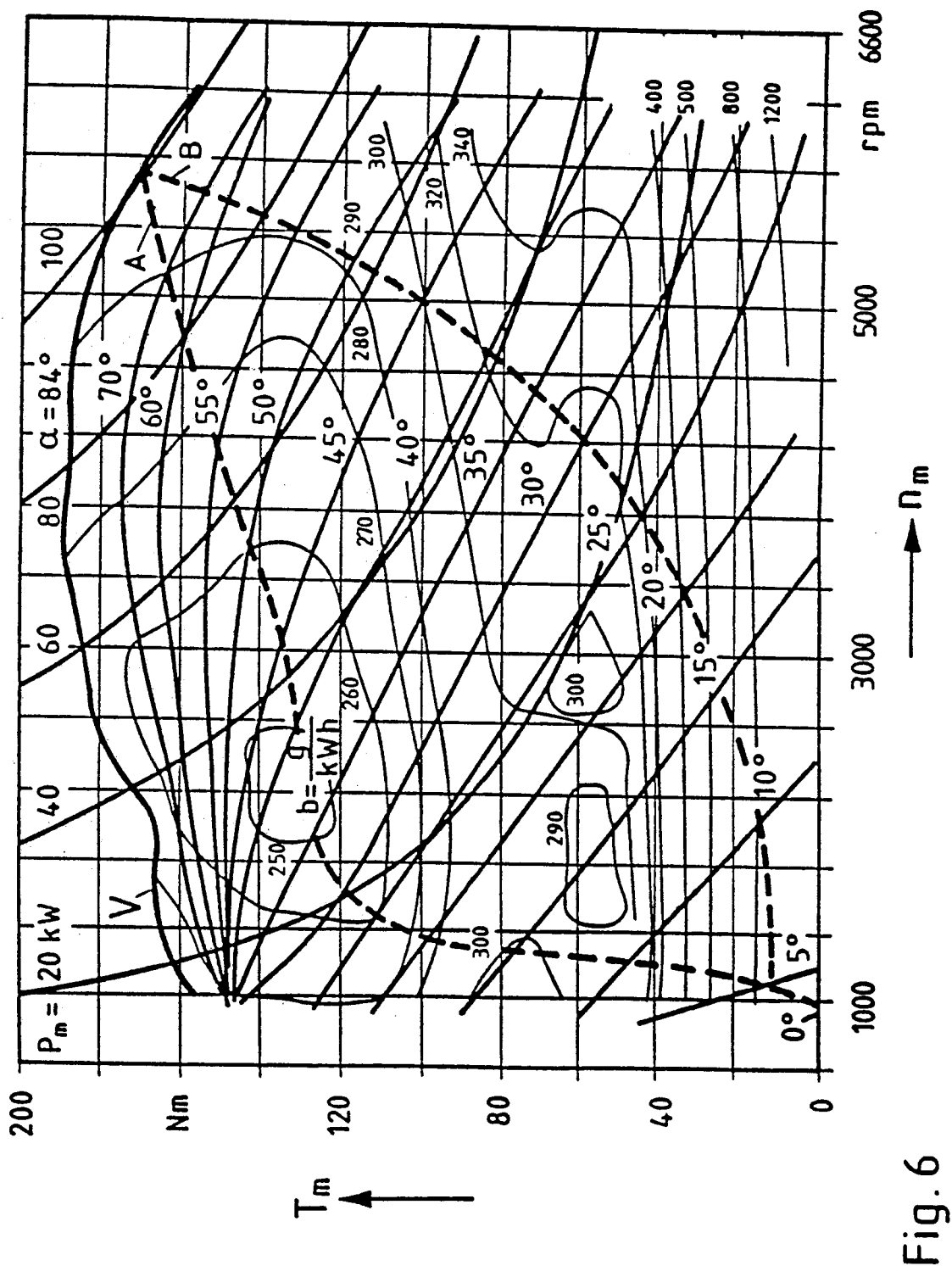
FIG. 6 shows the family of characteristic curves of a spark-ignition engine.

FIG. 6 shows, as an example, the family of characteristic curves of a spark-ignition engine. The ordinate indicates the engine torque $T_m$ and the absissa the engine speed $n_m$. Curves which are plotted are the full-load characteristic V and the power hyperbolae $P_m$, the lines of constant throttle valve angle $\alpha$ and the curves of constant specific fuel consumption b. In addition, FIG. 6 includes the characteristic A for economical fuel consumption and characteristic B for sporty driving, in which greater engine torques are available for acceleration in the partial-load range.

Figure 7:
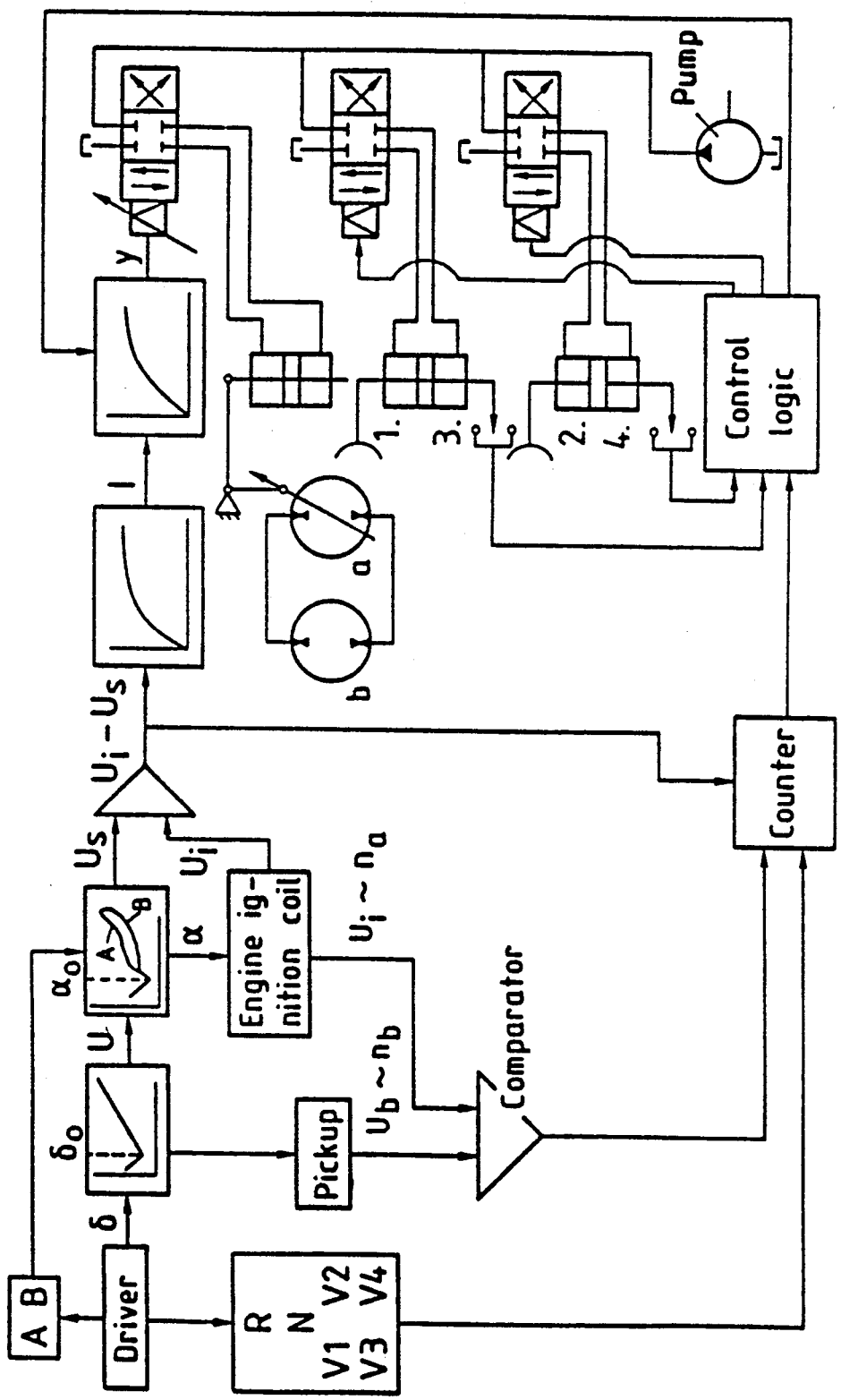
FIG. 7 diagrammatically represents the design of the electronic hydraulic control system of the prior art apparatus.

FIG. 7 diagrammatically represents the design of the electronic hydraulic control system. The gear is used as final control element for influencing the motor speed $n_m$.

The driver has to choose between neutral N, reverse R, forward V1 for operation with only first gear, V2 for operation with only first and second gears, V3 for operation with only first, second and third gears or V4 for operation with all gears. Changing over between positions V1 to V4 and between A and B can take place during travel. Operation with reduced number of gears assists sporty driving.

In addition, the driver operates the gas pedal, which is in connection with a potentiometer 51. This generates a voltage U dependent on the gas pedal angle $\delta$ or the throttle valve angle $\alpha$. According to FIG. 6, each throttle valve angle $\alpha$ has along the characteristic A and the characteristic B in each case a certain associated set speed of the engine $n_{ms}$, which is proportional to a voltage $U_s$. These characteristics are digitally stored in an electronic component 53. Upon input of a voltage U, this component 53 delivers a corresponding voltage $U_s$. It is compared with an actual voltage $U_i$, which in the same way is proportional to the existing engine speed $n_{mi}$ and can be generated for example with the aid of the engine ignition coil 54. With a voltage difference $U_i - U_s$ outside a given tolerance, a correcting displacement y is produced in a 4-3-way proportional valve 55 via a current I, so that an oil flow moves the piston operator of the displacer a for a transmission change of the gear. With positive values $U_i - U_s$ the transmission is reduced and with negative values it is increased. For $67 = \delta_o$, the throttle valve is closed with $\alpha = \alpha_o$. For gas pedal angles $\delta < \delta_o$, there are increases of U and $U_s$, so that a braking by the engine can take place.

An electronic counter 57 registers the gear engaged. A gear change takes place if the displacers a and b have the same speeds. An inductive pickup 59 delivers a voltage $U_b$ proportional to the speed $n_b$. The voltage $U_i$ behaves in the same way proportional to the speed $n_a$. If there is equality of the speed amounts, the counter 57 receives an information signal from the comparator 61. In addition, the counter is informed of the voltage difference $U_i - U_s$ in order that it can decide whether it has to increment or decrement by 1. The control logic 67 receives signals from the counter 57 and from the displacement pickups, which report a neutral position of the shift piston for the toothed clutches. Consequently, when there is a gear change, the sequence of the two 4-3-way shift valves 63, 65 to be operated is fixed. Finally, the control logic 67 delivers a signal to the proportional valve to swing the displacer a in the correct direction depending on the gear engaged.

The above equations show that, with a given overall rangeability $\phi_g$, an increase in the number of gears q results in a smaller individual rangeability $\phi$ and thus also in a smaller hydrostatic power flow $|P_h/P_{an}|_{max}$. The hydrostatic gear then becomes smaller, which has favorable effects on weight, overall size and efficiency of the hydrostatic mechanical power shift gear. The increase in the number of gears offers the advantages mentioned in particular in the case of large overall rangeabilities $\phi_g$, such as with tractors and commercial vehicles. However, the increase in the number of gears must not become too complex.

In the case of the gear according to FIG. 1, with an 8-speed shifted gear, an additional eight wheels and a further two double clutches would be required and, in the case of a 12-speed shifted gear, even an additional sixteen wheels and four further double clutches.

The present invention involves reducing the complexity found for increasing the number of gears.

Figure 8:
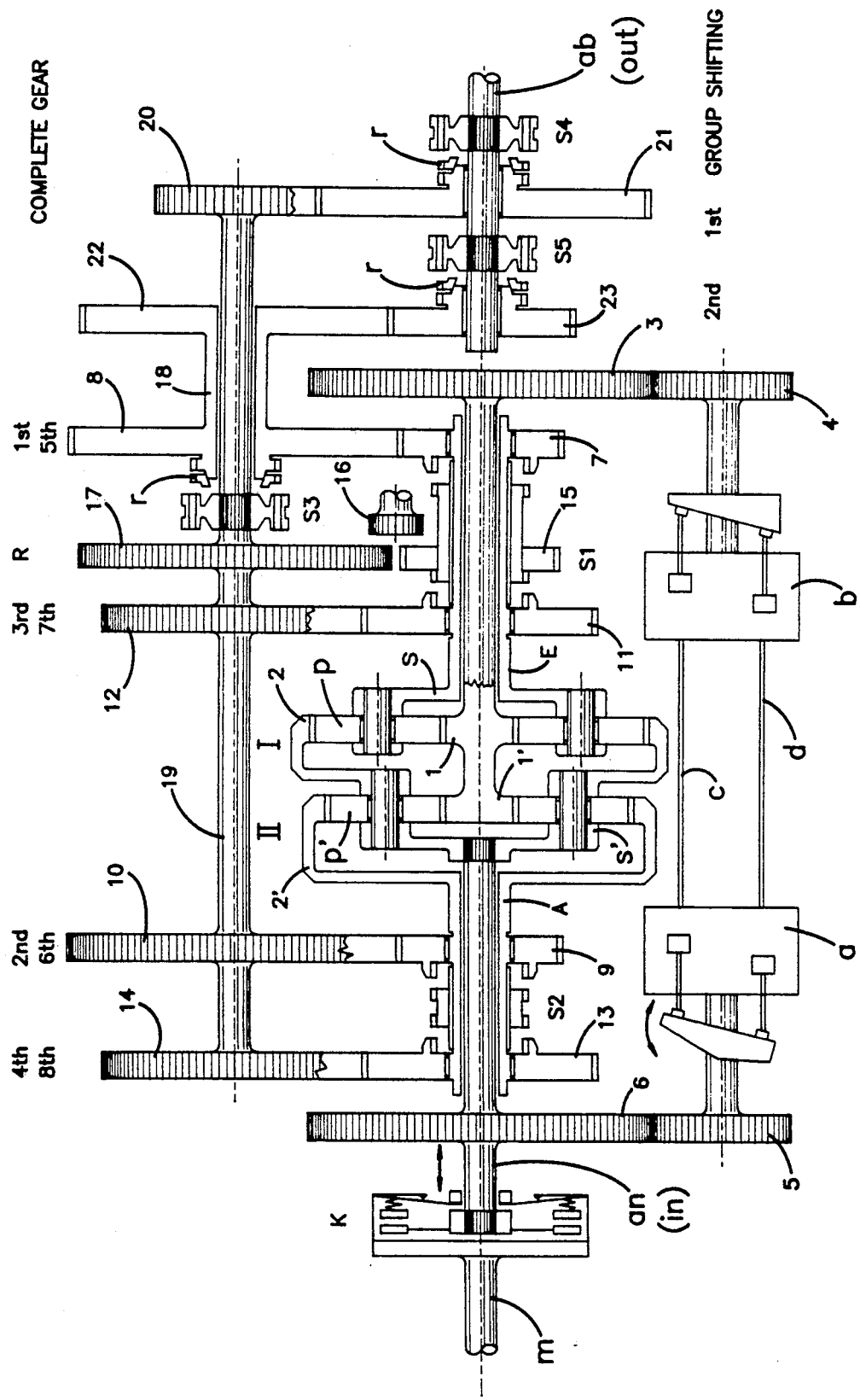
FIG. 8 is a first embodiment of the present invention.

FIG. 8 shows an exemplary embodiment of the invention. By way of extending the gear according to FIG. 1, the wheel 8 of the first gear is in connection with a countershaft 18 designed as a hollow shaft. Through this countershaft 18 passes a second countershaft 19 solidly connected to the wheel 10 of the second gear, wheel 12 of the third gear, wheel 14 of the fourth gear and wheel 17 of the reverse gear. The two countershafts 18 and 19 can be interconnected by the shifting toothed clutch S3. The shifting toothed clutch S4 can connect the countershaft 19 to the output shaft "out" via the first group shifting, which includes wheels 20 and 21, and the shifting toothed clutch S5 can connect the countershaft 18 to the output shaft "out" via the second group shifting, which includes wheels 22 and 23. The shifting toothed clutches S3, S4 and S5 are provided with synchronizing rings r, which effect a synchronization of the idling gear parts during the shifting operation.

The first, second, third, fourth and R gears are referred to as gears of a gear group. They form, with the following first group shifting, the first, second, third, fourth and R complete gears, and with the following second group shifting, the fifth, sixth, seventh and eighth complete gears.

During starting and in the first complete gear, the power to be carried through flows from the connecting shaft E via the toothed clutch S1, the wheels 7, 8, hollow shaft 18, toothed clutch S3, solid shaft 19, wheels 20, 21 and toothed clutch S4 to the output shaft "out".

In the second complete gear, the power flow is from the connecting shaft A via the toothed clutch S2, wheels 9, 10, solid shaft 19, wheels 20, 21 and toothed clutch S4 to the output shaft "out". During operation in the second complete gear, the toothed clutch S3 is disengaged.

In the third complete gear, the power flows from the connecting shaft E via the toothed clutch S1, wheels 11, 12, solid shaft 19, wheels 20, 21 and toothed clutch S4 to the output shaft "out".

In the fourth complete gear, the power flow is from the connecting shaft A via the toothed clutch S2, wheels 13, 14, solid shaft 19, wheels 20, 21 and toothed clutch S4 to the output shaft "out". During operation in the fourth complete gear, the toothed clutch S5 synchronizes the idling wheels 7, 8, 22 and 23 to the output shaft "out". Preparation for the change from the fourth complete gear to the fifth complete gear free from load and with synchronous speeds may thus be made.

In the fifth complete gear, the power flows from the connecting shaft E via the toothed clutch S1, the wheels 7, 8, the hollow shaft 18, wheels 22, 23 and toothed clutch S5 to the output shaft "out". During operation in the fifth complete gear, the clutch S4 is disengaged. Subsequently, the toothed clutch S3 synchronizes the idling gear parts, which are in connection with the solid shaft 19, with the hollow shaft 18. The clutch S3 is thus engaged. Now the preparatory shifts have been made to engage successively the following higher gears.

In the sixth complete gear, the power flow is from the connecting shaft A via the toothed clutch S2, wheels 9, 10, solid shaft 19, toothed clutch S3, hollow shaft 18, wheels 22, 23 and toothed clutch S5 to the output shaft "out".

In the seventh complete gear, the power flows from the connecting shaft E via the toothed clutch S1, wheels 11, 12, solid shaft 19, toothed clutch S3, hollow shaft 18, wheels 22, 23 and toothed clutch S5 to the output shaft "out".

Finally, in the eighth complete gear, the power flow is from the connecting shaft A via the toothed clutch S2, wheels 13, 14, solid shaft 19, toothed clutch S3, hollow shaft 18, wheels 22, 23, toothed clutch S5 to the output shaft "out".

In the R - gear the wheel 16 is axially moved in the engagement and the power flows from shaft E through wheels 15, 16, 17, 20, 21 to output shaft out.

Shifting down takes place analogously to shifting up. Operations to be performed now as preparatory shifts, during operation in the fifth complete gear, are to disengage the toothed clutch S3 and engage the toothed clutch S4 and furthermore, during operation in the fourth complete gear, to disengage the toothed clutch S5 and finally, in the second complete gear, to again close the clutch S3.

With the designations $i_{G1}$ being transmission of the first group shifting and $i_{G2}$ transmission of the second group shifting and $i_{G3}$ transmission of a conceivable third group shifting, the following apply for the transmissions of the gears within the gear group:

$$i_1 = i_2 = \frac{i_{an-ab-max}}{i_{G1} \cdot \phi} \quad i_3 = i_4 = \frac{i_1}{\phi^2}$$

and the transmissions of the group shiftings:

$$i_{G2} = \frac{i_{G1}}{\phi^4} \quad i_{G3} = \frac{i_{G2}}{\phi^4}$$

The transmission of the first group shifting may, for example, be chosen equal to the transmission of the first gear within the gear group, thus $$i_{G1} = i_1$$

Table 1 contains essential design data for the gear according to FIG. 8 given as an example. This table can also be consulted for the shift logic already described.

Figure 9:
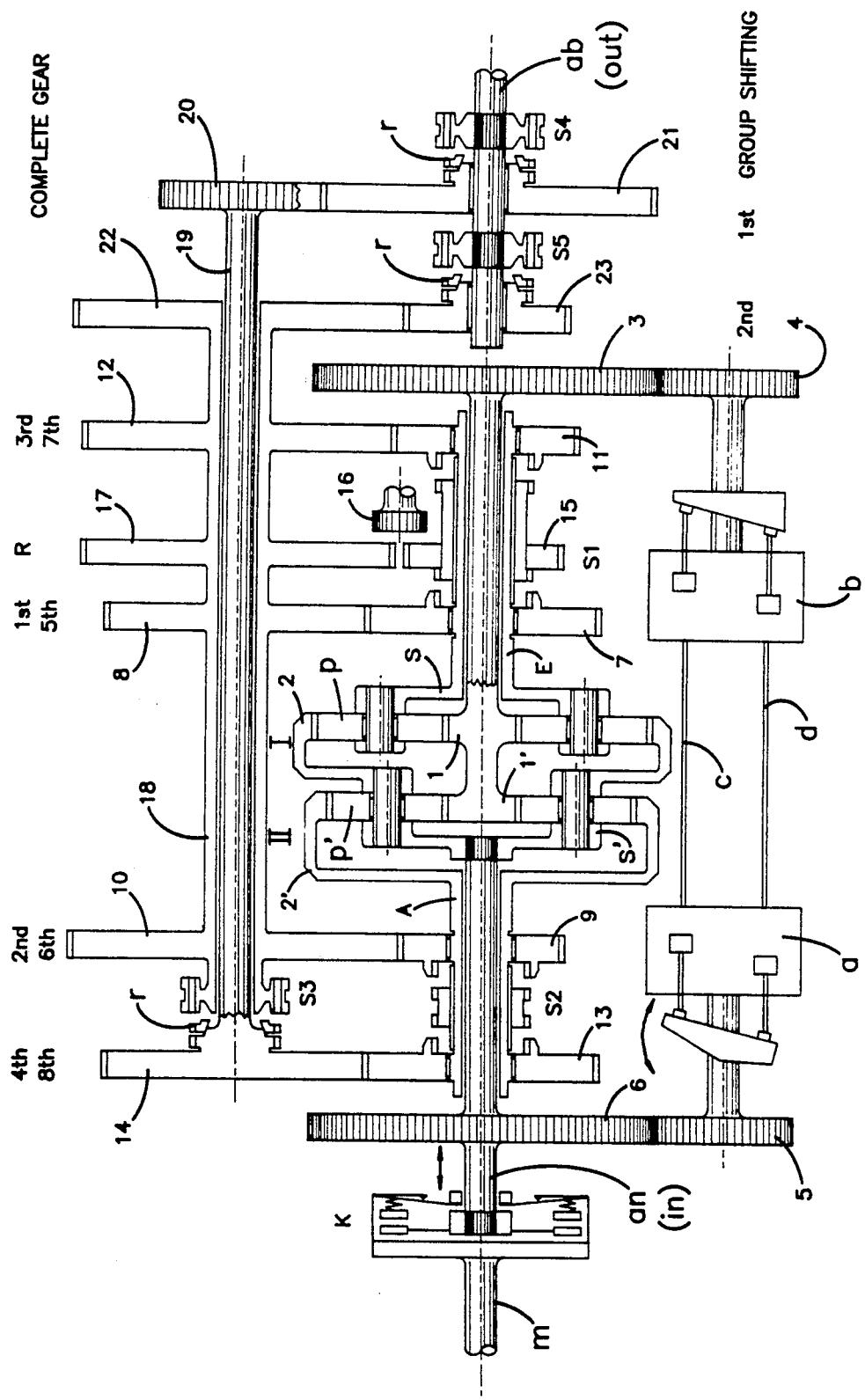
FIG. 9 is a second embodiment of the present invention.

FIG. 9 shows a further exemplary embodiment. In comparison with FIG. 8, the wheels 8, 10, 12 and 17 of the first, second, third and R gears of the gear group are now on the countershaft 18, while wheel 14 of the fourth gear of the gear group is connected to the countershaft 19.

Figure 10:
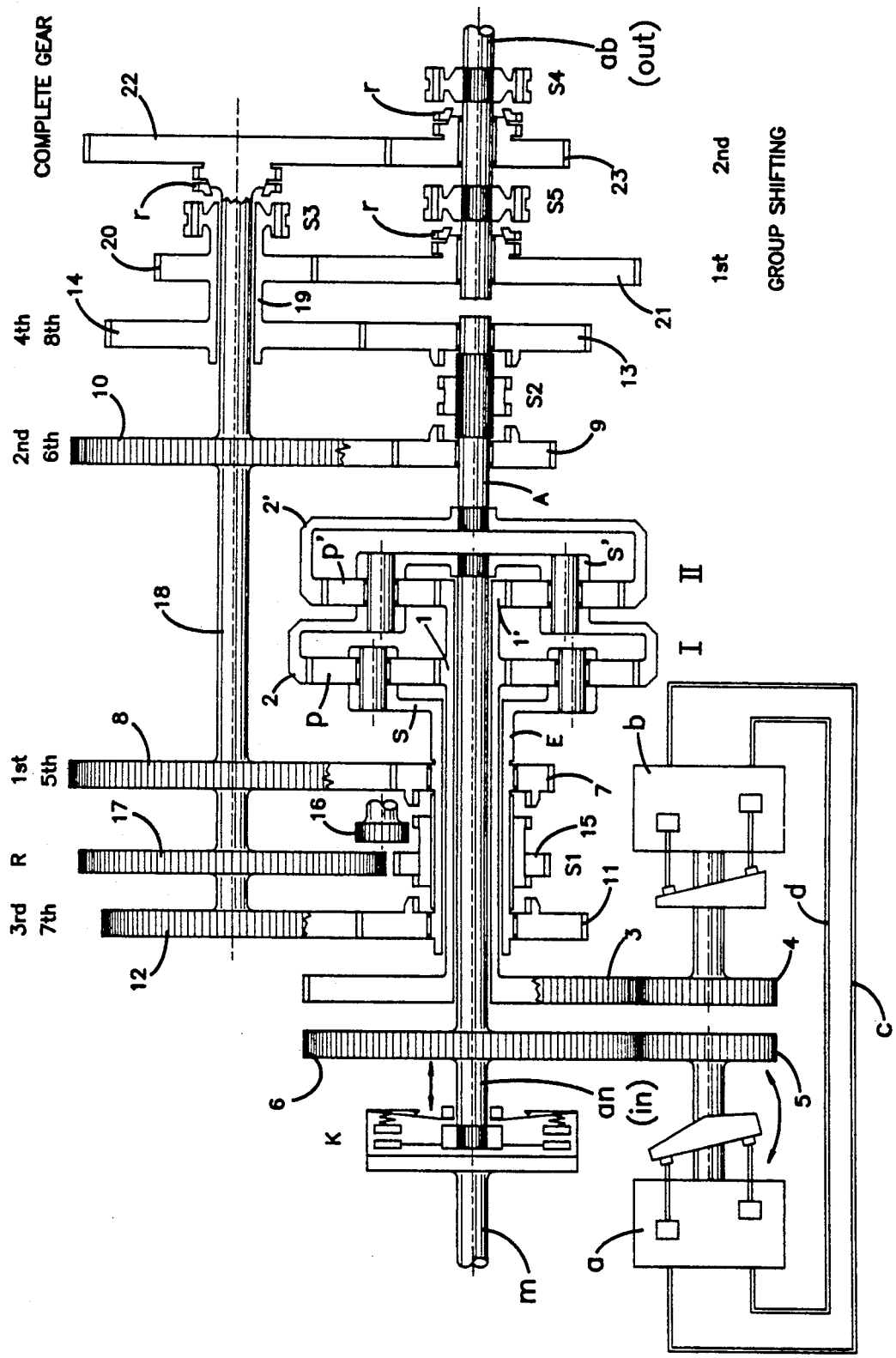
FIG. 10 is a third embodiment of the present invention.

A further exemplary embodiment is provided by FIG. 10. In comparison with the gears according to FIGS. 8 and 9, the planetary gears I and II are exchanged in their positions. As a result, the wheels 3, 4 for the connection of the displacer b and the connecting shaft E are now on the input side, while the connecting shaft A is on the output side. The wheels 8, 10, 12 and 17 of the first, second, third and R gears of the gear group are in connection with the countershaft 18. The wheel 14 of the fourth gear of the gear group belongs to the countershaft 19. This concept also results in an exchanged position of the first and second group shiftings.

Table 2 contains the data and specifications on the shift logic for the gears according to FIGS. 9 and 10.

Figure 11:
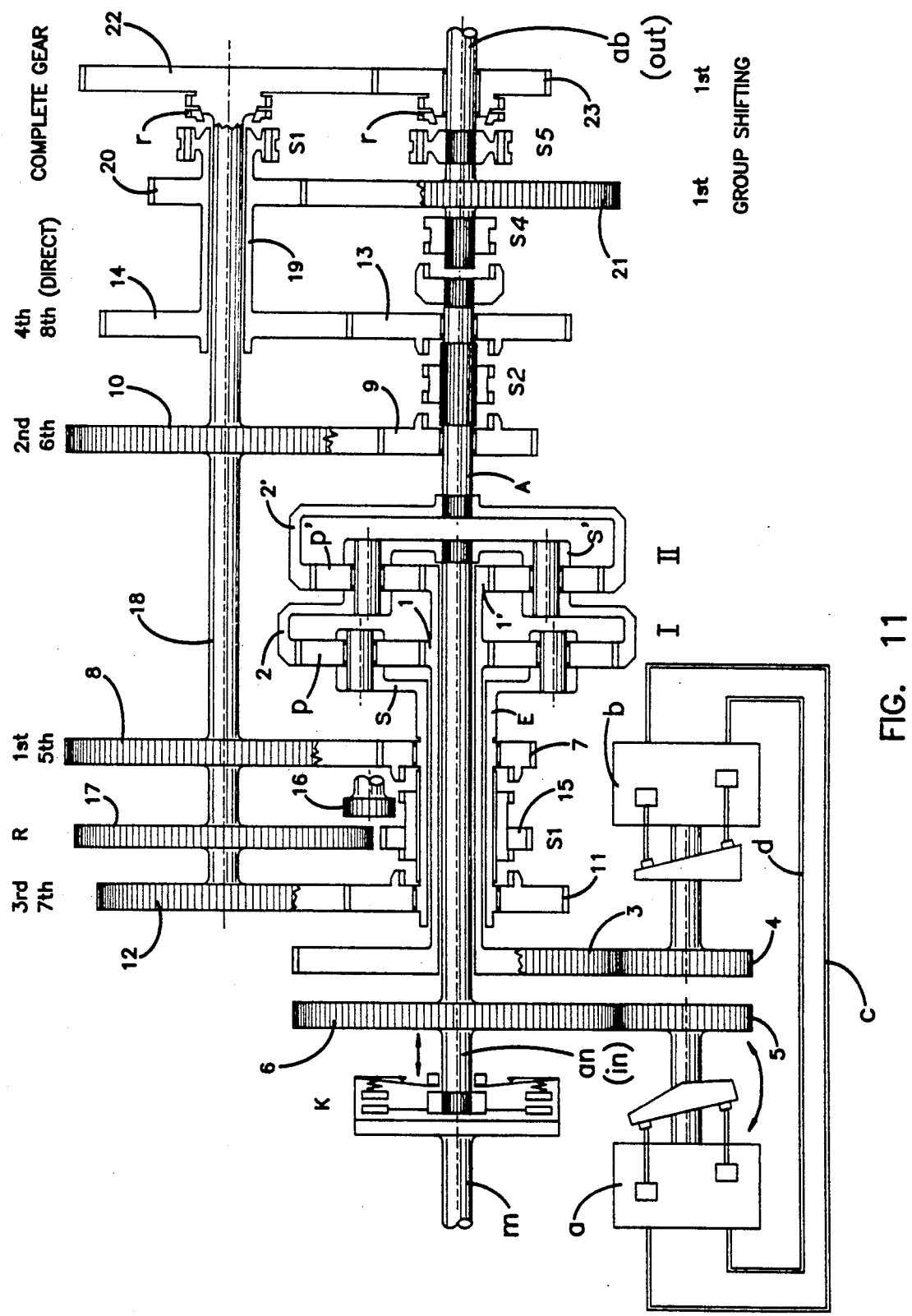
FIG. 11 is a fourth embodiment of the present invention.

FIG. 11 illustrates a further exemplary embodiment, wherein the fourth gear of the gear group with the wheels 13, 14 and the second group shifting with the wheels 22, 23 have reciprocal transmissions. It is now possible via the toothed clutch S4 to activate the eighth complete gear by connecting the connecting shaft A directly to the output shaft "out". In this gear, the efficiency of the gear system is improved as a result. Compared with the gear according to FIG. 10, now the wheel 21 of the first group shifting is seated firmly on the output shaft "out".

tershaft 18. For the connection of the wheel 21 of the first group shifting into the output shaft "out", the single toothed clutch S6 is provided.

Figure 12:
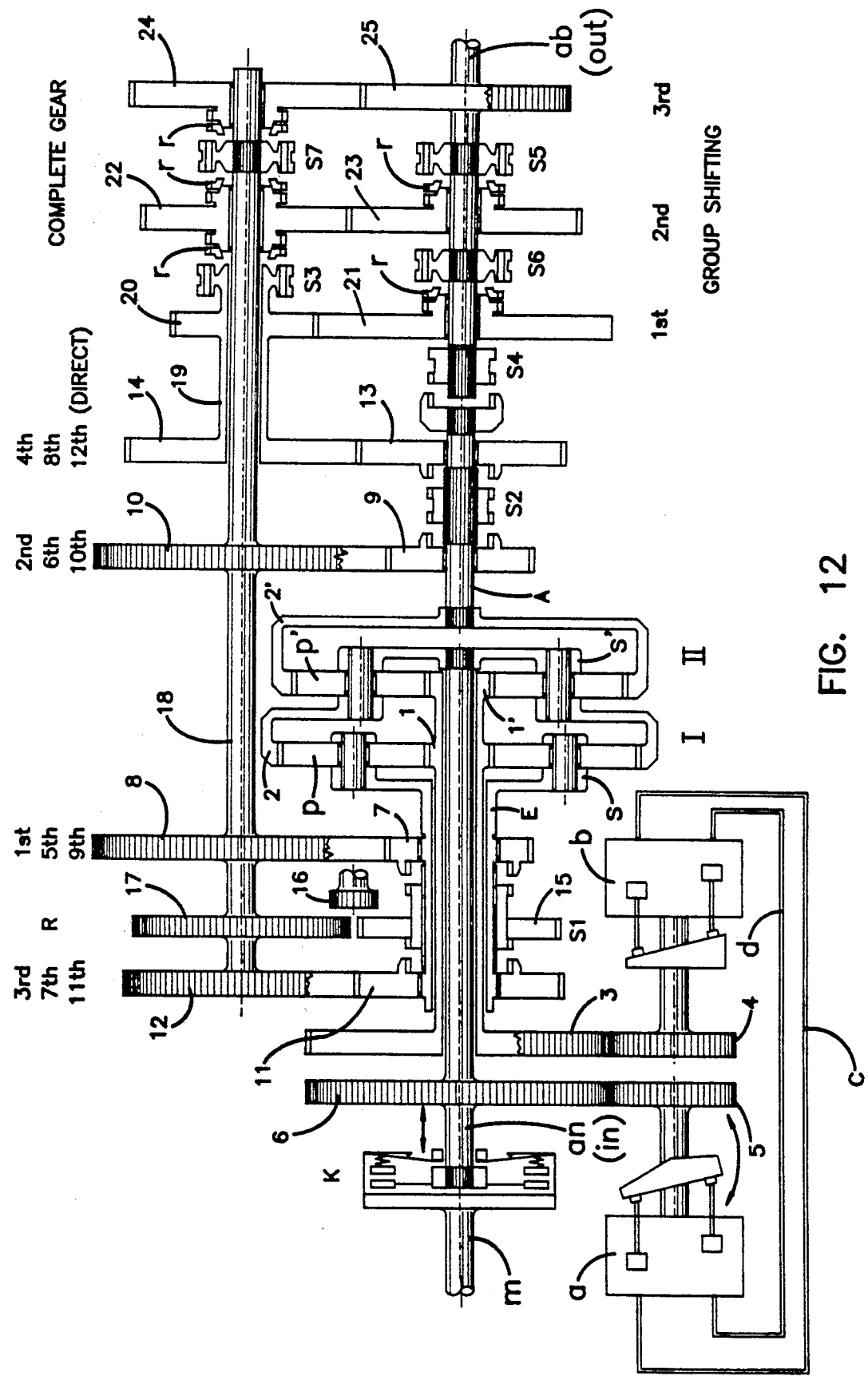
FIG. 12 is a fifth embodiment of the present invention.

Table 4 contains the data and specifications on the shift logic for the gear according to FIG. 12.

Figure 13:
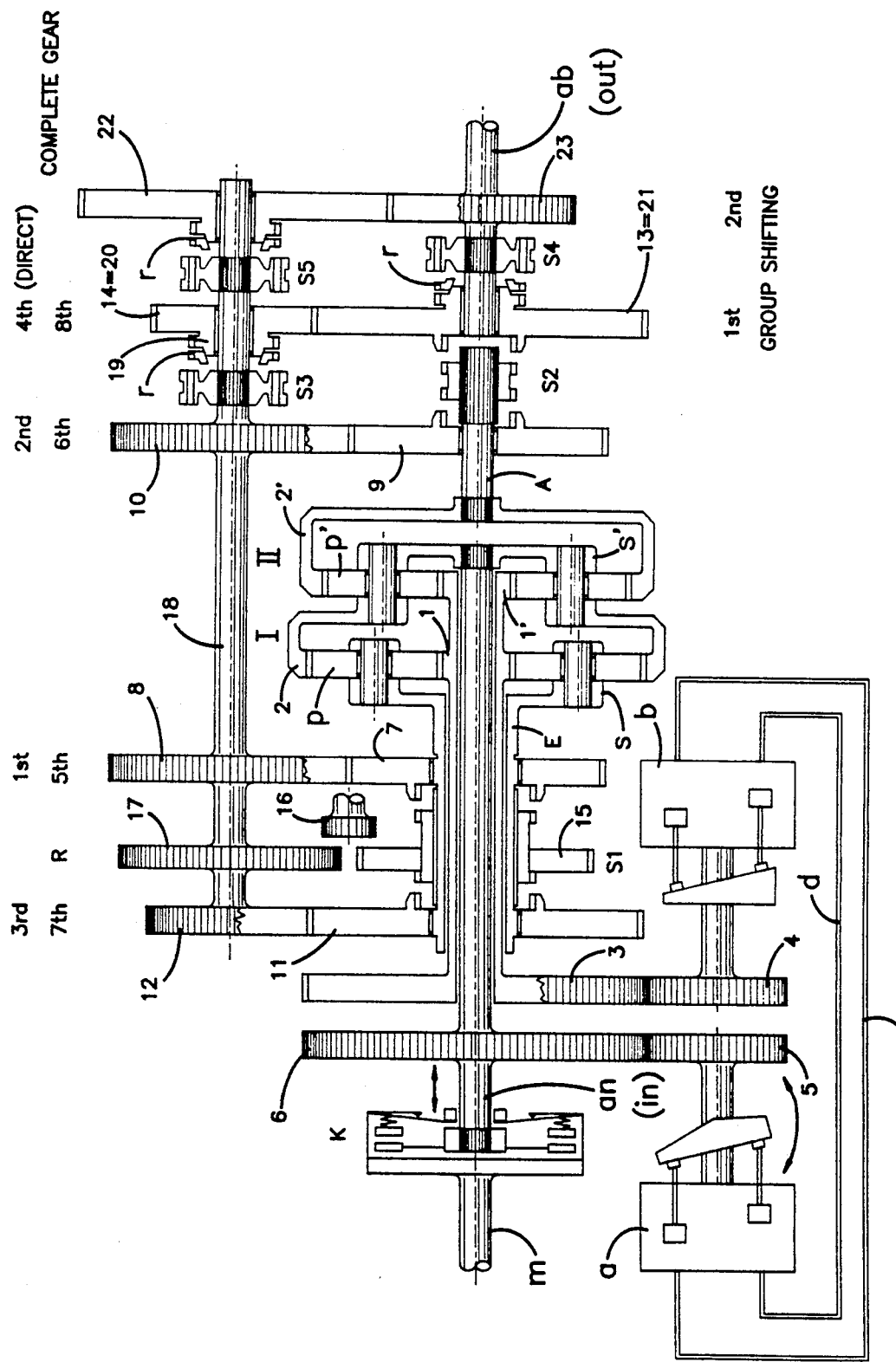
FIG. 13 is a sixth embodiment of the present invention.

In the case of the exemplary embodiment according to FIG. 13, the third gear with the wheels 11, 12, of the gear group and the first group shifting with the wheels 20, 21 have reciprocal transmissions. The third and fourth complete gears therefore have the transmission 1. It thus becomes possible to shift the fourth complete

TABLE 1

Data and shift logic for the gear according to FIG. 8

$i_{an\text{-}ab\text{-}max} = 7 \quad \phi_g = 14 \quad \phi = 1.391 \quad i_{oI} = -6.12 \quad i_{oII} = -5.12 \quad (P_h/P_{an})_{max} = 0.2$

| Complete gear | | Gear group | | Group shifting | | Shifting clutch | | | | | | | | |
|---|---|---|---|---|---|---|---|---|---|---|---|---|---|---|
| | | | | | | S1 | | S2 | | S3$^X$ | | S4$^X$ | | S5$^X$ |
| g | i | g | i | g | i | Shaft | Wheel | Shaft | Wheel | Shaft | Shaft | Shaft | Wheel | Shaft | Wheel |
| 1st | 5.031 | 1st | −2.243 | 1st | −2.243 | E | 7 | | | 18 | 19 | out | 21 | | |
| 2nd | 5.031 | 2nd | −2.243 | | | | | A | 9 | 18 | ....19 | out | 21 | | |
| 3rd | 2.6 | 3rd | −1.159 | | | E | 11 | | | | | out | 21 | | |
| 4th | 2.6 | 4th | −1.159 | | | | | A | 13 | | | out | 21 | out | ----23 |
| 5th | 1.344 | 1st | −2.243 | 2nd | −0.599 | E | 7 | | | 18 | ----19 | out | ....21 | out | 23 |
| 6th | 1.344 | 2nd | −2.243 | | | | | A | 9 | 18 | 19 | | | out | 23 |
| 7th | 0.694 | 3rd | −1.159 | | | E | 11 | | | 18 | 19 | | | out | 23 |
| 8th | 0.694 | 4th | −1.159 | | | | | A | 13 | 18 | 19 | | | out | 23 |

$^X$Shifting toothed clutch with synchronization system
— Shifting for the synchronization of free wheel stages during shifting up
.... Shifting for the synchronization of free wheel stages during shifting down

TABLE 2

Data and shift logic for the gears according to FIGS. 9 and 10

$i_{an\text{-}ab\text{-}max} = 7 \quad \phi_g = 14 \quad \phi = 1.391 \quad i_{oI} = -6.12 \quad i_{oII} = -5.12 \quad (P_h/P_{an})_{max} = 0.2$

| Complete gear | | Gear group | | Group shifting | | Shifting clutch | | | | | | | | |
|---|---|---|---|---|---|---|---|---|---|---|---|---|---|---|
| | | | | | | S1 | | S2 | | S3$^X$ | | S4$^X$ | | S5$^X$ |
| g | i | g | i | g | i | Shaft | Wheel | Shaft | Wheel | Shaft | Shaft | Shaft | Wheel | Shaft | Wheel |
| 1st | 5.031 | 1st | −2.243 | 1st | −2.243 | E | 7 | | | 18 | 19 | out | 21 | | |
| 2nd | 5.031 | 2nd | −2.243 | | | | | A | 9 | 18 | 19 | out | 21 | | |
| 3rd | 2.6 | 3rd | −1.159 | | | E | 11 | | | 18 | 19 | out | 21 | | |
| 4th | 2.6 | 4th | −1.159 | | | | | A | 13 | 18 | ....19 | out | 21 | out | ----23 |
| 5th | 1.344 | 1st | −2.243 | 2nd | −0.599 | E | 7 | | | | | out | ....21 | out | 23 |
| 6th | 1.344 | 2nd | −2.243 | | | | | A | 9 | | | | | out | 23 |
| 7th | 0.694 | 3rd | −1.159 | | | E | 11 | | | 18 | ----19 | | | out | 23 |
| 8th | 0.694 | 4th | −1.159 | | | | | A | 13 | 18 | 19 | | | out | 23 |

$^X$Shifting toothed clutch with synchronization system
— Shifting for the synchronization of free wheel stages during shifting up
.... Shifting for the synchronization of free wheel stages during shifting down Table 3 contains the data and specifications on the shift logic for the gear according to FIG. 11.

The exemplary embodiment according to FIG. 12 differs from that according to FIG. 11 by an additional group shifting. Thus it has three group shiftings, producing 12 complete gears with four gears within the gear group. The third group shifting includes the wheels 24, 25. The double toothed clutch S7 can connect either the wheel 24 of the third group shifting or the wheel 22 of the second group shifting to the countershaft 18.

gear as a direct gear, via the toothed clutches S2 and S4. Furthermore, however, it is also possible in operation via the second group shifting with the wheels 22, 23 for the first group shifting with the wheels 20, 21 to be set up as fourth gear of the gear group. The wheels 13 and 21 are then identical and so are 14 and 20. In comparison with the gear according to FIG. 11, two wheels can therefore be saved. Wheel 23 is now seated firmly on the output shaft "out", while wheel 22 can be connected with the toothed clutch S5 on the countershaft 18.

TABLE 3

Data and shift logic for the gear according to FIG. 11

$i_{an\text{-}ab\text{-}max} = 10$   $\phi_g = 14$   $\phi = 1.391$   $i_{oI} = -6.12$   $i_{oII} = -5.12$   $(P_h/P_{an})_{max} = 0.2$

| Transmissions i Gear numbers g | | | | | | Shifting clutch | | | | | | | | |
|---|---|---|---|---|---|---|---|---|---|---|---|---|---|---|
| Complete gear | | Gear group | | Group shifting | | S1 | | S2 | | S3$^X$ | | S4$^X$ | | S5$^X$ |
| g | i | g | i | g | i | Shaft | Wheel | Shaft | Wheel | Shaft | Shaft | Shaft | Wheel | Shaft | Wheel |
| 1st | 7.241 | 1st | −2.691 | 1st | −2.691 | E | 7 | | | 18 | 19 | | | | |
| 2nd | 7.241 | 2nd | −2.691 | | | | | A | 9 | 18 | 19 | | | | |
| 3rd | 3.743 | 3rd | −1.391 | | | E | 11 | | | 18 | 19 | | | | |
| 4th | 3.743 | 4th | −1.391 | | | | | A | 13 | 18 | ....19 | | | out | ----23 |
| 5th | 1.935 | 1st | −2.691 | 2nd | −0.719 | E | 7 | | | | | | | out | 23 |
| 6th | 1.935 | 2nd | −2.691 | | | | | A | 9 | | | | | out | 23 |
| 7th | 1.0 | 3rd | −1.391 | | | E | 11 | | | | | | | out | 23 |
| 8th | 1.0 | 4th | −1.391 | | | | | | | | | A | out | out | ....23 |

$^X$Shifting toothed clutch with synchronization system
---- Shifting for the synchronization of free wheel stages during shifting up
.... Shifting for the synchronization of free wheel stages during shifting down

TABLE 4

Data and shift logic for the gear according to FIG. 12

$i_{an\text{-}ab\text{-}max} = 11.24$   $\phi_g = 14$   $\phi = 1.246$   $i_{oI} = -9.13$   $i_{oII} = -8.13$   $(P_h/P_{an})_{max} = 0.123$

| Transmissions i Gear numbers g | | | | | | Shifting clutch | | | | | | | | |
|---|---|---|---|---|---|---|---|---|---|---|---|---|---|---|
| Complete gear | | Gear group | | Group shifting | | S1 | | S2 | | S3$^X$ | | S4$^X$ | | S5$^X$ |
| g | i | g | i | g | i | Shaft | Wheel | Shaft | Wheel | Shaft | Shaft | Shaft | Wheel | Shaft | Wheel |
| 1st | 9.018 | 1st | −3.003 | 1st | −3.003 | E | 7 | | | 19 | 22 | | | | |
| 2nd | 9.018 | 2nd | −3.003 | | | | | A | 9 | 19 | 22 | | | | |
| 3rd | 5.808 | 3rd | −1.934 | | | E | 11 | | | 19 | 22 | | | | |
| 4th | 5.808 | 4th | −1.934 | | | | | A | 13 | 19 | ....22 | | | out | ----23 |
| 5th | 3.742 | 1st | −3.003 | 2nd | −1.246 | E | 7 | | | | | | | out | 23 |
| 6th | 3.742 | 2nd | −3.003 | | | | | A | 9 | | | | | out | 23 |
| 7th | 2.410 | 3rd | −1.934 | | | E | 11 | | | 19 | ----22 | | | out | 23 |
| 8th | 2.410 | 4th | −1.934 | | | | | A | 13 | 19 | 22 | | | out | 23 |
| 9th | 1.553 | 1st | −3.003 | 3rd | −0.517 | E | 7 | | | 19 | ....22 | | | out | ....23 |
| 10th | 1.553 | 2nd | −3.003 | | | | | A | 9 | | | | | | |
| 11th | 1.0 | 3rd | −1.934 | | | E | 11 | | | | | | | | |
| 12th | 1.0 | 4th | −1.934 | | | | | | | | | A | out | | |

| Transmissions i Gear numbers g Complete gear | | Shifting clutch | | | |
|---|---|---|---|---|---|
| | | S6$^X$ | | S7$^X$ | |
| g | i | Shaft | Wheel | Shaft | Wheel |
| 1st | 9.018 | out | 21 | 18 | 22 |
| 2nd | 9.018 | out | 21 | 18 | 22 |
| 3rd | 5.808 | out | 21 | 18 | 22 |
| 4th | 5.808 | out | 21 | 18 | 22 |
| 5th | 3.742 | out | ....21 | 18 | 22 |
| 6th | 3.742 | | | 18 | 22 |
| 7th | 2.410 | | | 18 | 22 |
| 8th | 2.410 | | | 18 | ----24 |
| | | | | 18 | ....22 |
| 9th | 1.553 | | | 18 | 24 |
| 10th | 1.553 | | | 18 | 24 |
| 11th | 1.0 | | | 18 | 24 |
| 12th | 1.0 | | | 18 | ....24 |

Figure 14:
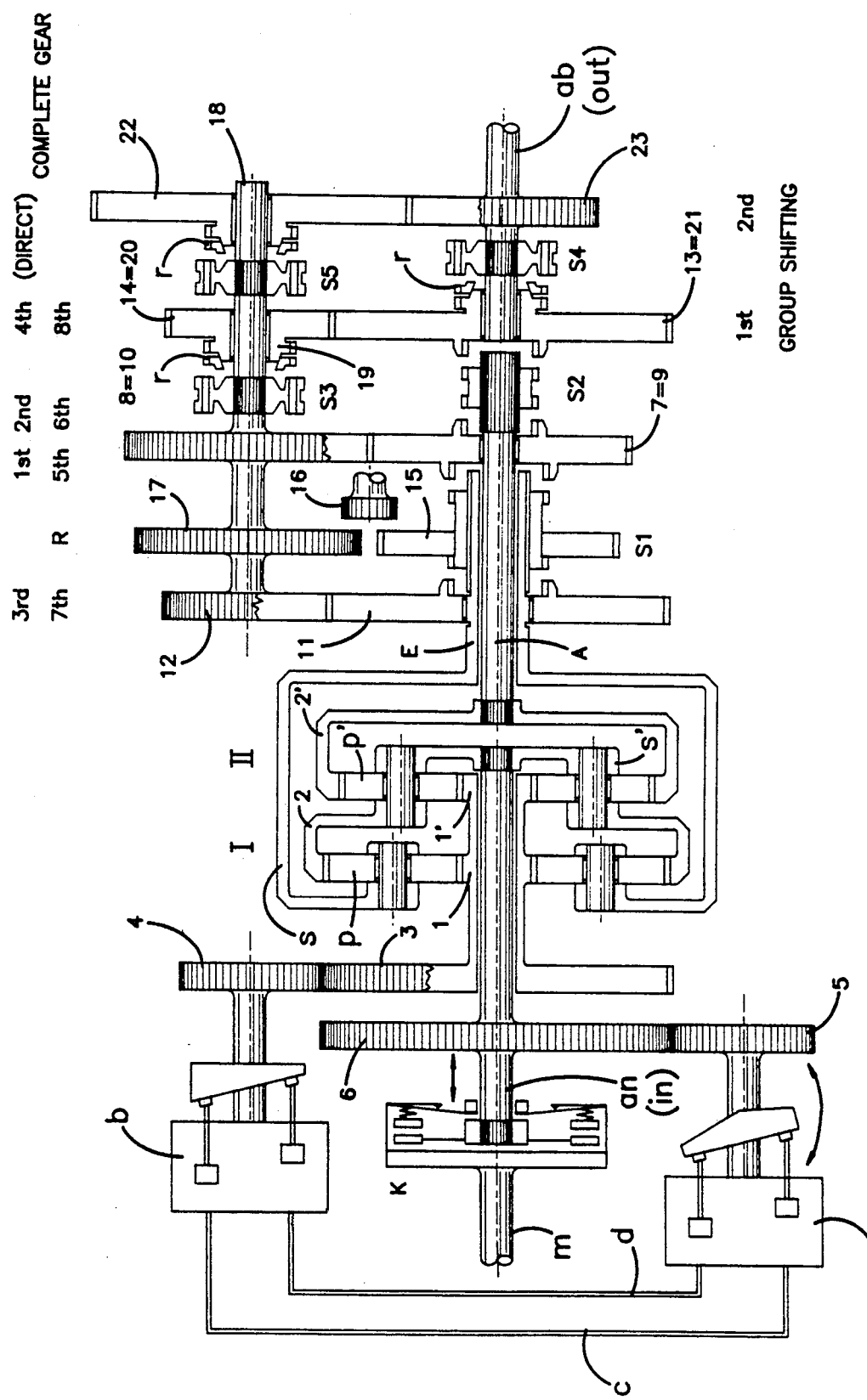
FIG. 14 is a seventh embodiment of the present invention.

$^X$Shifting toothed clutch with synchronization system
---- Shifting for the synchronization of free wheel stages during shifting up
.... Shifting for the synchronization of free wheel stages during shifting down A comparison of the gears according to FIG. 14 and FIG. 13 shows that, in the case of the exemplary embodiment according to FIG. 14 a further two wheels can be saved. Both connecting shafts E and A are now on the output side. As a result it is possible for the first gear and second gear within the gear group to use the same wheels. The wheels 7 and 9 are now identical and so are 8 and 10.

Table 5 contains the data and specifications on the shift logic for the gears according to FIGS. 13 and 14.

In the gears according to the exemplary embodiments of FIGS. 8-14, the first gear of the gear group is in connection with the countershaft 18 and the final gear, i.e. the fourth gear of the gear group is in connection with the countershaft 19. For the gear according to FIG. 8, the remaining gears of the gear group are connected to the countershaft 19, and for the gear according to FIGS. 9-14, they are connected to the countershaft 18. Concepts are also possible in which some of the remaining gears of the gear group are in connection with the countershaft 18 and the others are in connection with the countershaft 19.

Figure 15:
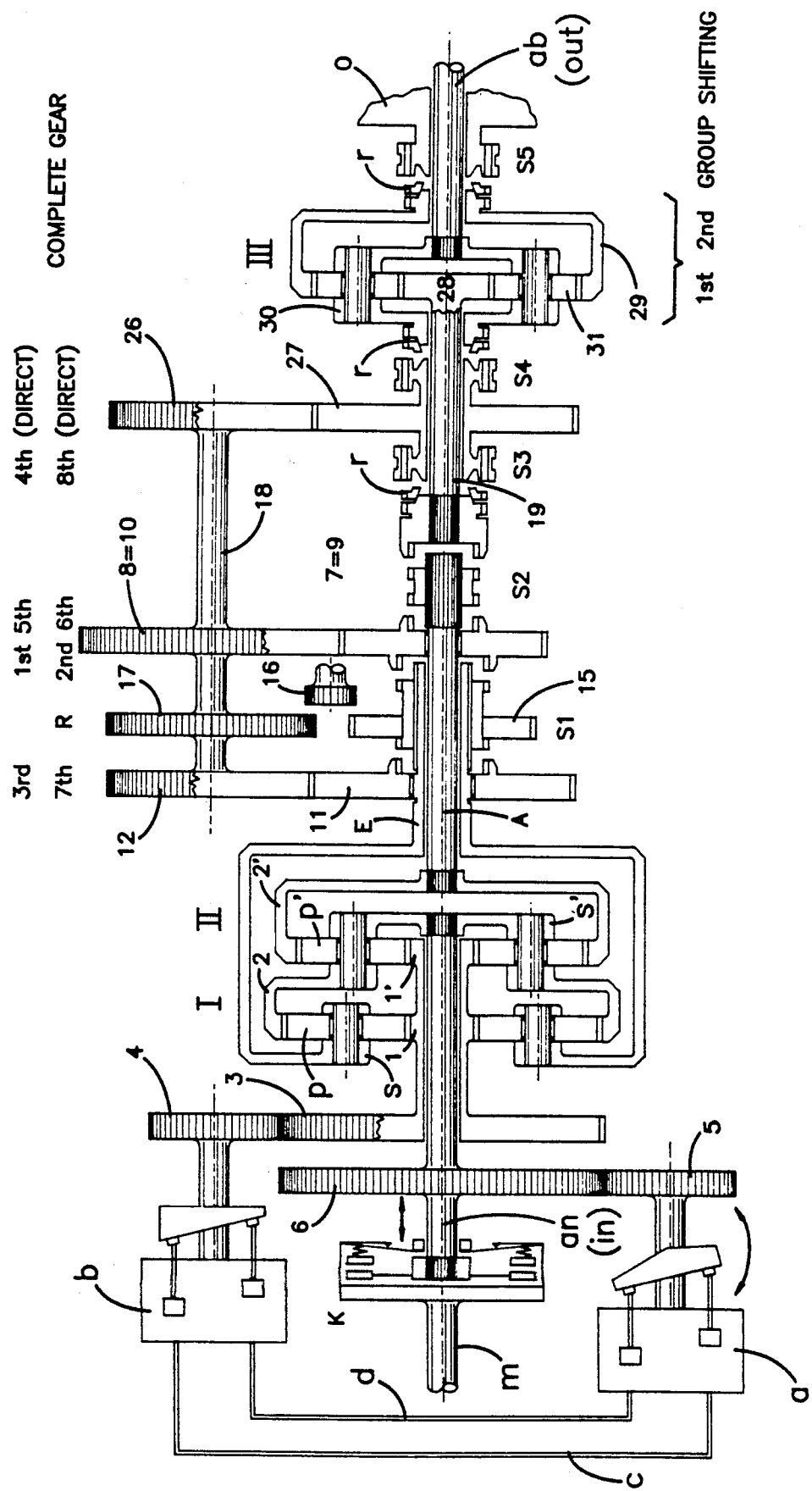
FIG. 15 is an eighth embodiment of the present invention.

The gear according to the exemplary embodiment of FIG. 15 differs from that according to FIG. 14 in that the countershaft 19 is coaxial to the input shaft and output shaft and can be connected to the countershaft 18 via the toothed clutch S3 and wheels 27, 26. The group shiftings constitute a planetary gear III, and includes the sun gear 28, the ring gear 29 and the planet carrier 30 with the planet gears 31. The sun gear 28 is solidly connected to the countershaft 19. In the case of the first group shifting, the ring gear 29 is connected by the toothed clutch S5 to the gear housing 0. The power then flows from the sun gear 28 via the planet carrier 30 to the output shaft "out". In the case of the second group shifting, the toothed clutches S3 and S4 are closed, while the toothed clutch S5 is open. The planetary gear III then circulates without loss as a clutch. The countershaft stage with the wheels 26, 27 belongs to the group shiftings.

Figure 17:
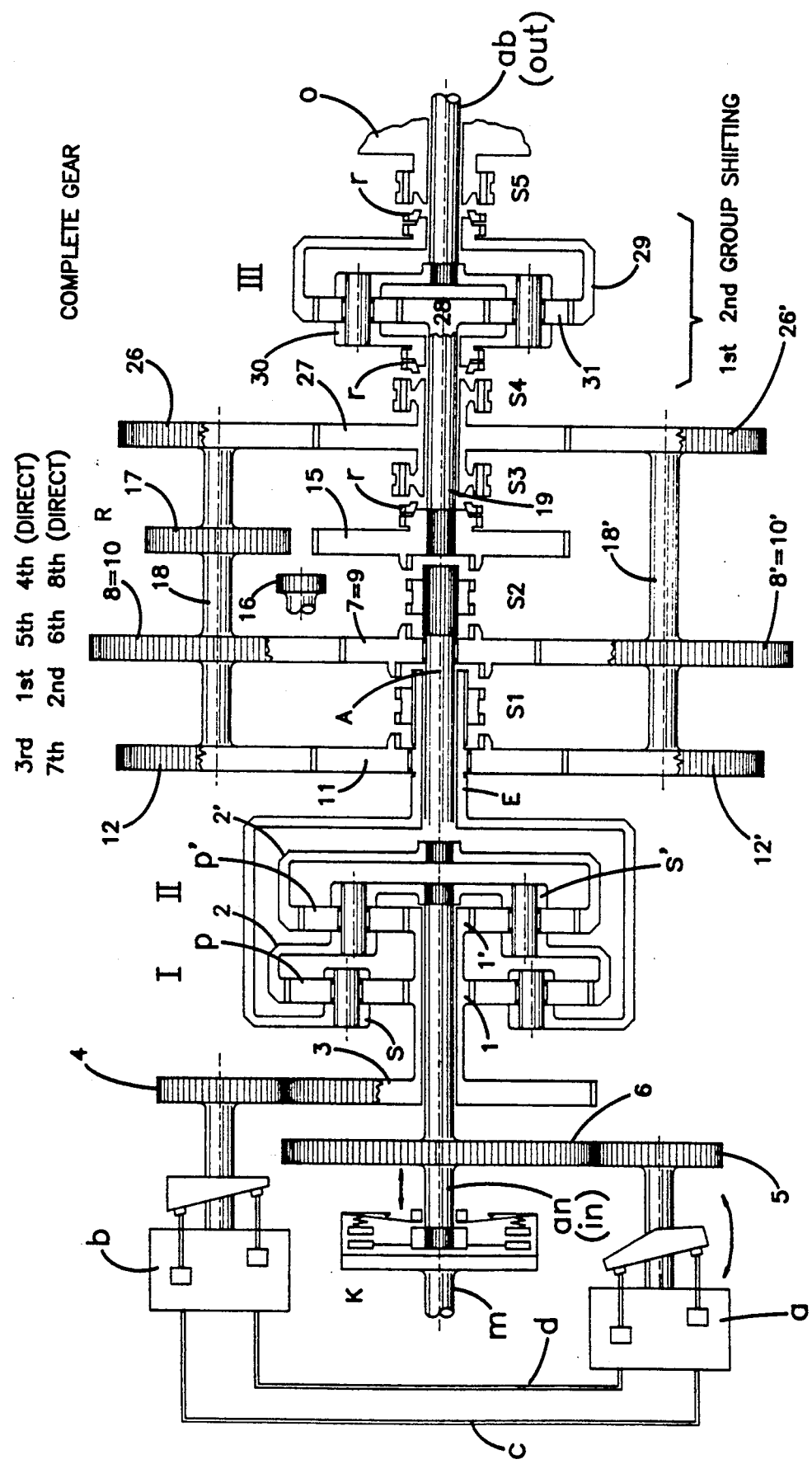
FIG. 17 is a tenth embodiment of the present invention.

The gear according to the exemplary embodiment of FIG. 17 is similar in design to the gear according to the embodiment of FIG. 15. To reduce the overall size and weight, the parallel arrangement of a second countershaft 18' with the wheels 12', 8'=10' and 26' provides power branching for the forward gears within the gear group.

Figure 16:
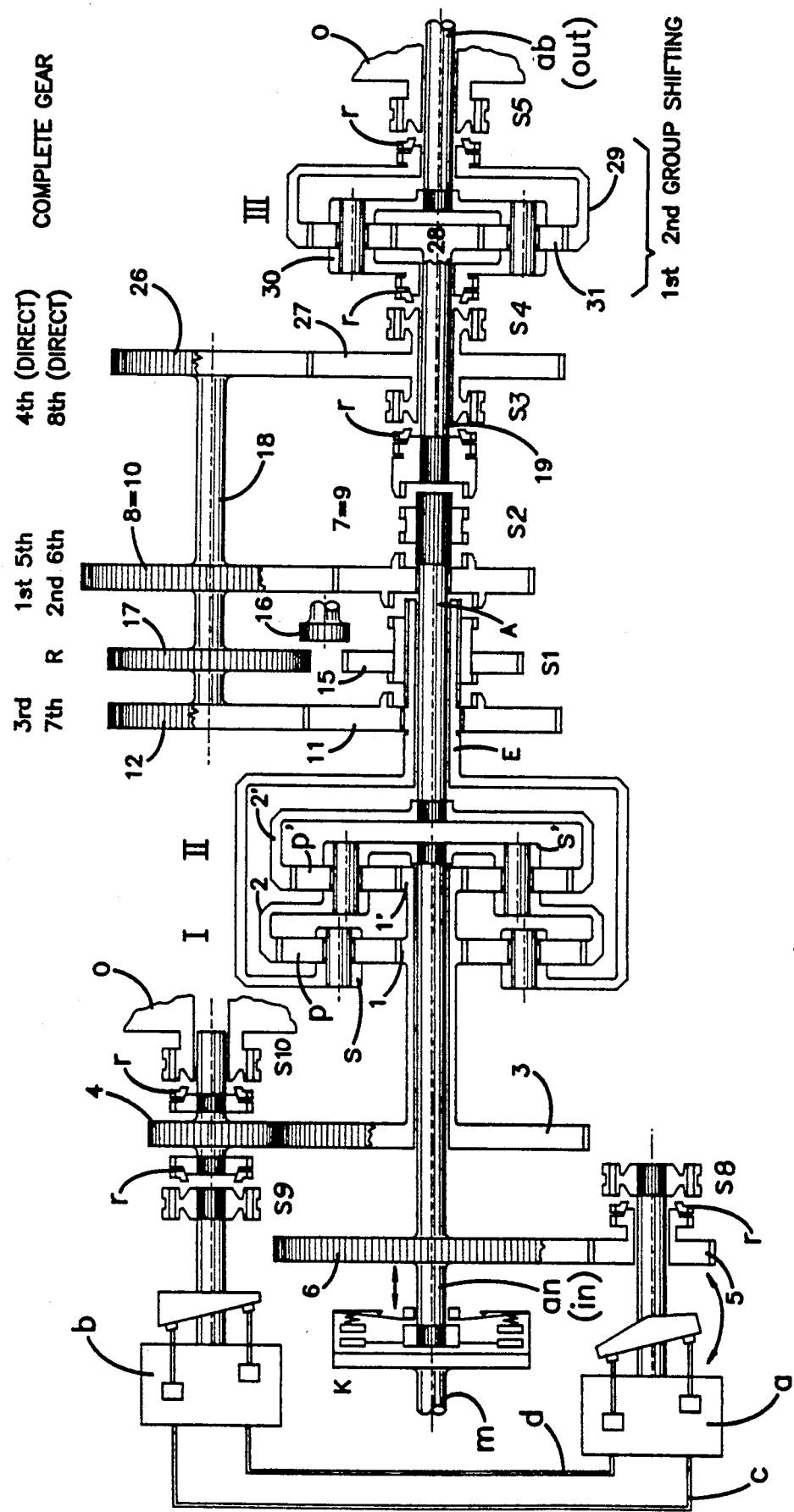
FIG. 16 is a ninth embodiment of the present invention.

Table 6 contains the data and specifications on the shift logic for the gear according to FIGS. 15, 16 and 17.

The numerical values specified in Tables 1-6 represent nominal values which are to be adjusted slightly to obtain even numbers of teeth and, in the case of the planetary gears, numbers of teeth which ensure that assembly is possible.

TABLE 6

Data and shift logic for the gears according to FIGS. 15, 16 and 17
$i_{an\text{-}ab\text{-}max} = 10.04$  $\phi_g = 14$  $\phi = 1.391$  $i_{oI} = -6.12$  $i_{oII} = -5.12$  $(P_h/P_{an})_{max} = 0.2$

| Complete gear | | Gear group | | Group shifting | | Shifting clutch | | | | | | | | |
|---|---|---|---|---|---|---|---|---|---|---|---|---|---|---|
| | | | | | | S1 | | S2 | | S3$^X$ | | S4$^X$ | | S5$^X$ |
| g | i | g | i | g | i | Shaft | Wheel | Shaft | Wheel | Shaft | Shaft | Shaft | Wheel | Shaft Wheel |
| 1st | 7.218 | 1st | −1.93 | 1st | −3.74 | E | 7 | | | 27 | 19 | | | 0  29 |
| 2nd | 7.218 | 2nd | −1.93 | | | | | A | 7 | 27 | 19 | | | 0  29 |
| 3rd | 3.74 | 3rd | −1.0 | | | E | 11 | | | 27 | 19 | | | 0  29 |
| 4th | 3.74 | 4th | −1.0 | | | | | A | 19 | 27 | ....19 | out | ----27 | 0  29 |
| 5th | 1.93 | 1st | −1.93 | 2nd | −1.0 | E | 7 | | | 27 | 19 | out | 27 | 0  ....29 |
| 6th | 1.93 | 2nd | −1.93 | | | | | A | 7 | 27 | 19 | out | 27 | |
| 7th | 1.0 | 3rd | −1.0 | | | E | 11 | | | 27 | 19 | out | 27 | |
| 8th | 1.0 | 4th | −1.0 | | | | | A | 19 | 27 | 19 | out | 27 | |

$^X$Shifting toothed clutch with synchronization system
---- Shifting for the synchronization of free wheel stages during shifting up
.... Shifting for the synchronization of free wheel stages during shifting down

TABLE 5

Data and shift logic for the gear according to FIGS. 13 and 14
$i_{an\text{-}ab\text{-}max} = 2.372$  $\phi_g = 10$  $\phi = 1.334$  $i_{oI} = -7.0$  $i_{oII} = -6.0$  $(P_h/P_{an})_{max} = 0.167$

| Complete gear | | Gear group | | Group shifting | | Shifting clutch | | | | | | | | |
|---|---|---|---|---|---|---|---|---|---|---|---|---|---|---|
| | | | | | | S1 | | S2 | | S3$^X$ | | S4$^X$ | | S5$^X$ |
| g | i | g | i | g | i | Shaft | Wheel | Shaft | Wheel | Shaft | Shaft | Shaft | Wheel | Shaft Wheel |
| 1st | 1.778 | 1st | −1.0 | 1st | −1.778 | E | 7 | | | 18 | 20 | out | 21 | |
| 2nd | 1.778 | 2nd | −1.0 | | | | | A | 9 | 18 | 20 | out | 21 | |
| 3rd | 1.0 | 3rd | −0.562 | | | E | 11 | | | 18 | 20 | out | 21 | |
| 4th | 1.0 | 4th | −0.562 | | | | | A | 21 | 18 | ....20 | out | 21 | 18  ----22 |
| 5th | 0.562 | 1st | −1.0 | 2nd | −0.562 | E | 7 | | | | | out | ....21 | 18  22 |
| 6th | 0.562 | 2nd | −1.0 | | | | | A | 9 | | | | | 18  22 |
| 7th | 0.316 | 3rd | −0.562 | | | E | 11 | | | 18 | ----20 | | | 18  22 |
| 8th | 0.316 | 4th | −0.562 | | | | | A | 21 | 18 | 20 | | | 18  22 |

$^X$Shifting toothed clutch with synchronization system
---- Shifting for the synchronization of free wheel stages during shifting up
.... Shifting for the synchronization of free wheel stages during shifting down The exemplary embodiment according to FIG. 16 is based on the gear according to the exemplary embodiment of FIG. 15. The concept according to FIG. 16 includes the possibility of stopping operation of the hydrostatic displacers a and b in each gear. As already explained at the start, the displacer b is at a standstill when the swash plate of the displacer a is perpendicular to its axis. If the wheel 4 is supported by means of the shifting toothed clutch S10 on the gear housing 0, the displacers a and b can be disconnected by the toothed clutches S8 and S9, improving the efficiencies of the gear at these operating points.

Figure 18:
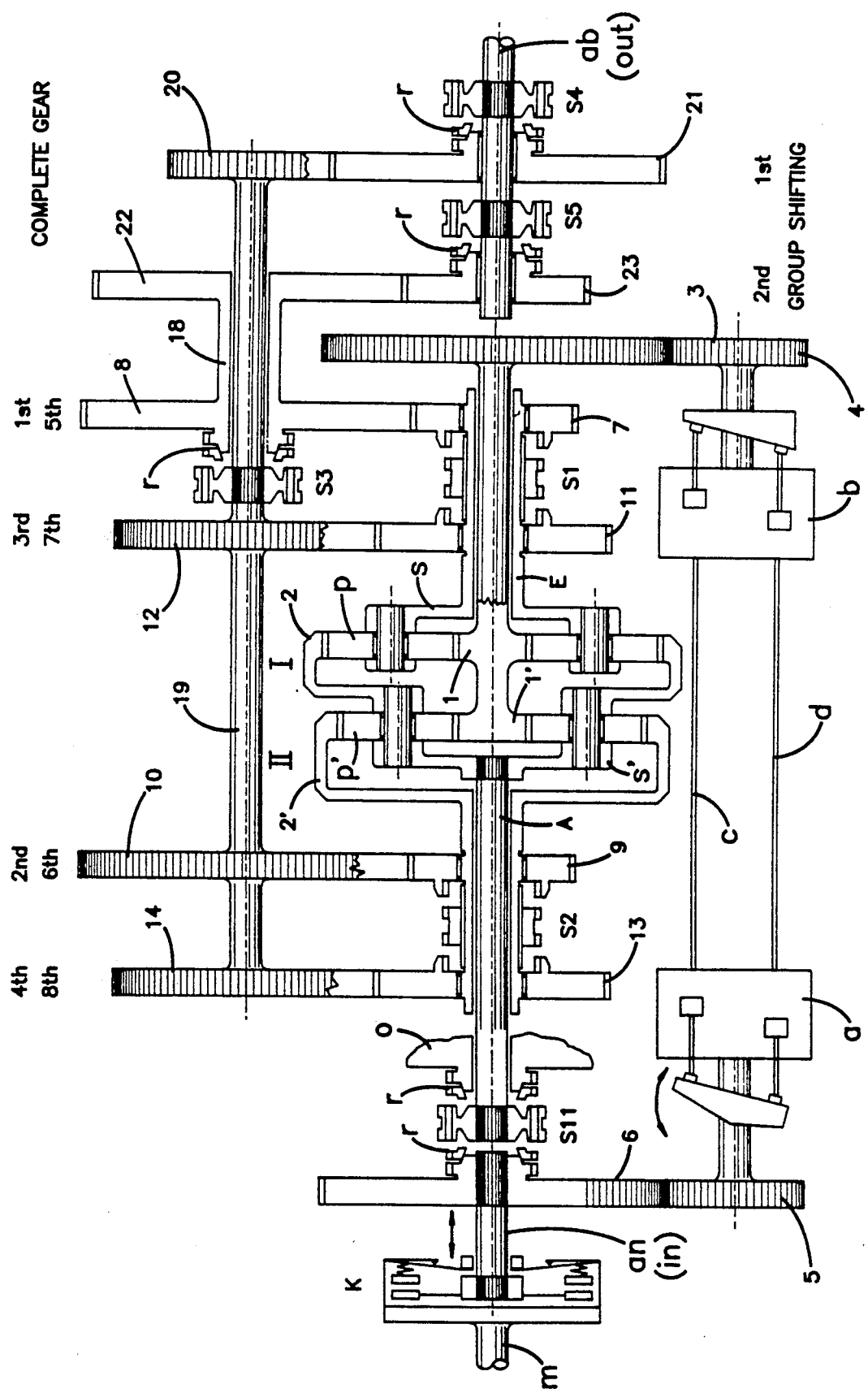
FIG. 18 is an eleventh embodiment of the present invention.

In the case of the exemplary embodiment of FIG. 18, the wheels of the reverse gear 15, 16, 17 can be saved through the use of the double shifting toothed clutch S11. In forward travel, toothed clutch S11 connects the input shaft "in" to the shaft s'. In reverse travel, it connects the shaft s' to the gear housing 0. The power then flows from the input shaft "in" via the wheels 6, 5, the displacers a, b, the planetary gear I and the first complete gear to the output shaft "out". Hence, clutches S1, S3 and S4 are engaged to connect shaft E to wheel 7, wheel 8 to shaft 19 and wheel 21 to output shaft "out", respectively. Otherwise, the gear according to FIG. 18 is designed like the gear according to FIG. 8.

In the embodiments of FIGS. 8-17, the connecting shafts E and A arise from the interconnection of the planetary gears I and II. The equations for the static transmissions $i_{0I}$ and $i_{0II}$ reveal that they obtain high values at low individual rangeabilities $\phi$. The static transmissions can then only be realized by the use of staged planet gears. However, such planetary gears take on large diameters and are therefore also heavy.

According to the invention, the connecting shafts E and A can also be driven by the interconnection of three planetary gears. With small individual rangeabilities $\phi$, they become smaller and lighter than if two planetary gears are used.

Figure 19:
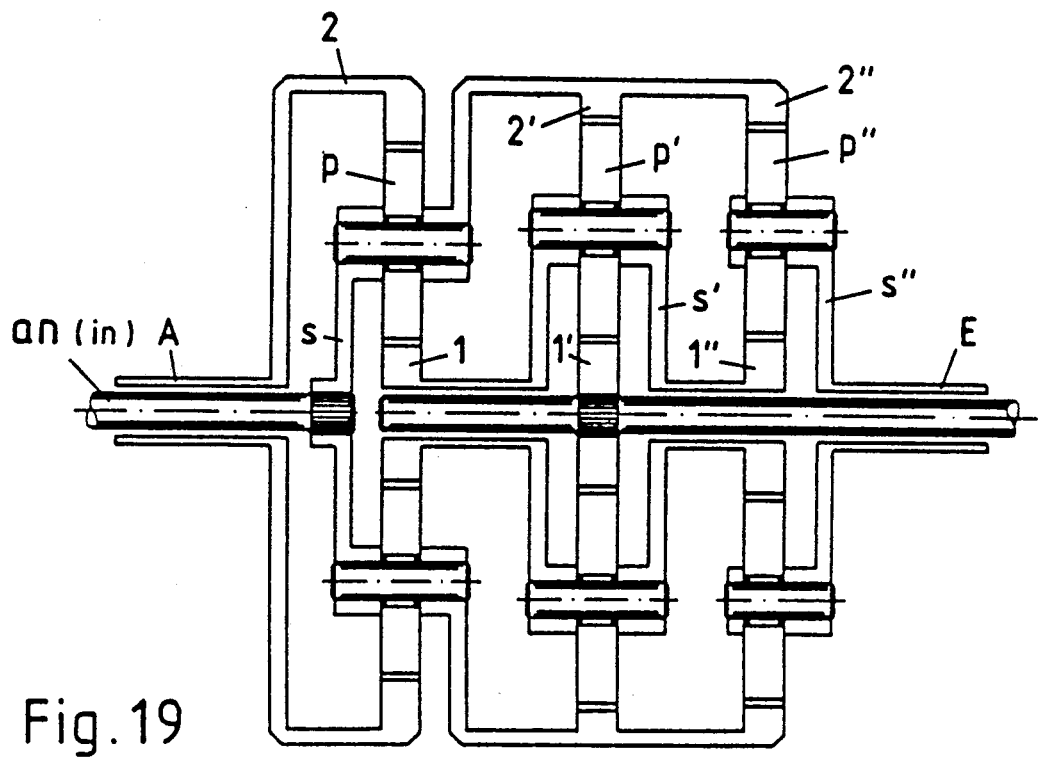
FIG. 19 is an alternative embodiment of a planetary gear assembly usable in the embodiments of the present invention.

In the exemplary embodiment according to FIG. 19, the planetary gear I includes the sun gear 1, the ring gear 2, the planet carrier s with the planet gears p; the planetary gear II includes the sun gear 1', the ring gear 2', the planet carrier s' with the planet gears p'; and the planetary gear III includes the sun gear 1'', the ring gear 2'' and the planet carrier s'' with the planet gears p''. Elements s, 2' and 2'' form a solidly interconnected unit. In a similar manner 1, s' and 1'' also form a solidly interconnected unit. The planet carrier s is fixedly attached to the input shaft "in". The sun gear 1' is used for the connection of the hydrostatic displacer b. Planet carrier s'' is solidly interconnected with the connecting shaft E, and ring gear 2 is solidly interconnected with the connecting shaft A. The following relationships apply for the static transmissions.

$$i_{0I}(1 - i_{0II}) = -\frac{2}{\phi - 1}$$

$$i_{0II} + i_{0III} - i_{0II} i_{0III} = -\frac{\phi + 1}{\phi - 1}$$

A static transmission may be freely selected.

Figure 20:
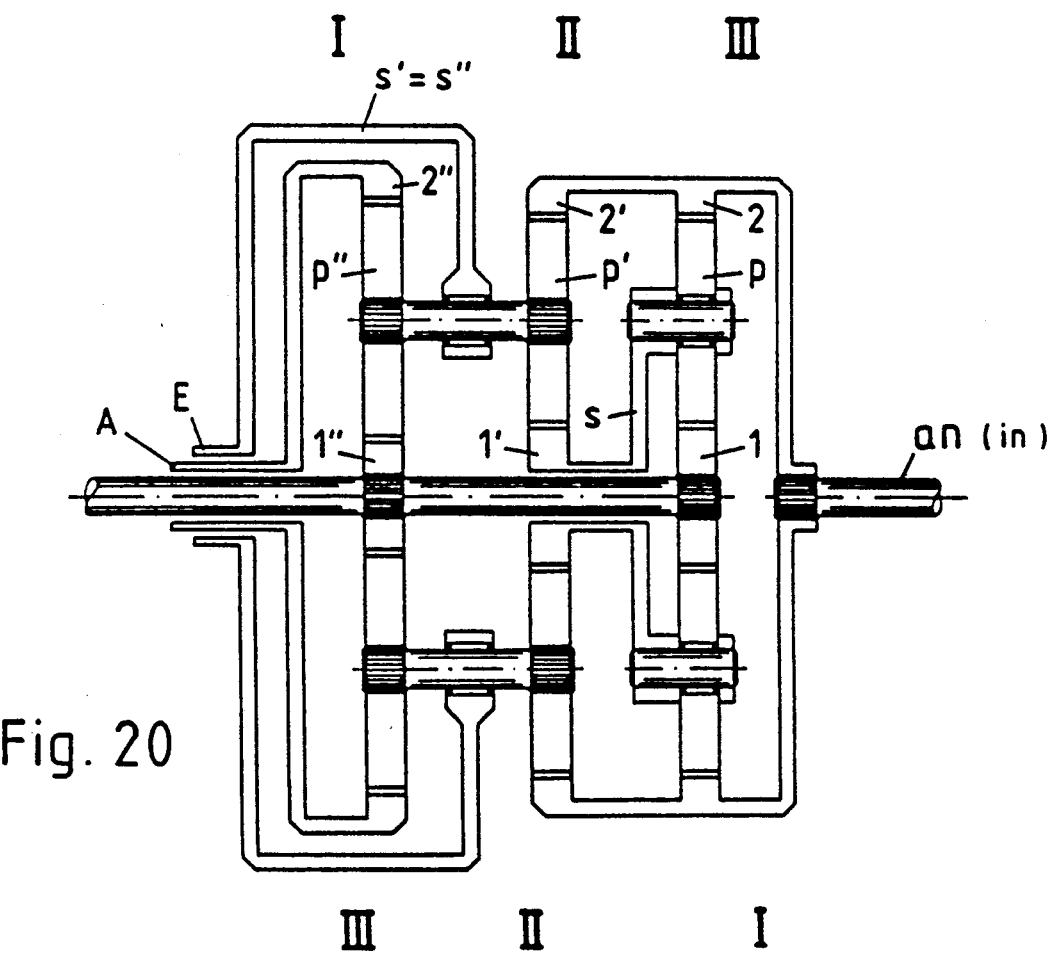
FIG. 20 is a second alternative embodiment of a planetary gear assembly which is usable in the embodiments of the present invention.

The exemplary embodiment according to FIG. 20 uses the same designations for the elements of the planetary gears I, II and III as in FIG. 19. Now the ring gears 2, 2' form a solidly interconnected unit, and so do the sun gears 1, 1'', as well as the planet carrier s and the sun gear 1', and also the planet carriers s', s''. The ring gear 2 is fixedly connected to the input shaft "in" The sun gear 1'' is used for the connection of the hydrostatic displacer b. Planet carrier s' is solidly interconnected with the connecting shaft E, and ring gear 2'' is solidly interconnected with the connecting shaft A. Now the following relationships apply for the static transmissions.

$$i_{0I} + i_{0II} - i_{0I} i_{0II} = -\frac{\phi + 1}{\phi - 1}$$

$$i_{0III} = -\frac{1}{\phi - 1}$$

$i_{0I}$ or $i_{0II}$ have to be given here.

The advantages achieved with the invention are a reduction in the design complexity, in the overall size and in the weight. In the following comparison, a double clutch is considered as two single clutches. With eight complete gears, in comparison with a design analogous to FIG. 1, a saving of six wheels and one single clutch is obtained in the case of the gears according to the embodiments of FIGS. 8, 9, 10 and 11, a saving of eight wheels and one single clutch in the case of the gear according to the embodiment of FIG. 13, and a saving of ten wheels and one single clutch in the case of the gear according to the embodiment of FIG. 14. In the case of the gear according to the embodiment of FIG. 15, one planetary gear is additionally required, but twelve wheels and one single clutch are saved.

The embodiments of the invention in which an exclusive property or privilege is claimed are defined as follows.

1. An infinitely variable hydrostatic mechanical power shift gear consisting of a four shaft epicyclic gear including at least two planetary stages, each having a shaft, one of said shafts being an input shaft (in) which is connected via first gear wheels (6, 5), second gear wheels (4, 3) and an infinitely variable hydrostatic gear (a, b) with a second shaft (1, 1'), the two remaining shafts of said epicyclic gear being connecting shafts (E and A) which, in one extreme position of the hydrostatic gear, have the same speed and during adjustment of the hydrostatic gear into the other extreme position vary their speed in such a way that one (E) becomes constantly slower and the other (A) constantly faster, a pair of countershafts 19 and 18 and a plurality of gear pairs connecting one or the other of said shafts A and E to one or the other and said countershafts 19 and 18, a plurality of clutches, each of said clutches being responsive to speed changes for selectively connecting one of said gear pairs between shafts to a shaft driven through said planetary stages to transmit motion between one of said shafts A or E to said countershaft 19 or to transmit motion between one of said shafts A or E to said countershaft 18, an output gear on each of said shafts 18 and 19, an output shaft having a pair of output receiving gears thereon, one output receiving gear engaging an output gear on countershaft 19 and the other engaging an output gear on countershaft 18 and clutch means on said output shaft for selectively connecting one or the other of said gears to said output shaft.

2. An infinitely variable hydrostatic mechanical power shift gear as described in claim 1 wherein one stage (I) of said epicyclic gear includes a sun gear (1), a ring gear (2) and a planet carrier (s) with planet gears (p), and the other stage (II) thereof includes a sun gear (1'), a ring gear (2') and a planet carrier (s') with planet gears (p'), the sun gear (1) of said one stage (I) being connected to the sun gear (1') of said other stage (II), and the ring gear (2) of said one stage (I) being connected to the planet carrier (s') of said other stage (II), and in which the planet carrier (s') of said other stage (II) and the ring gear (2) of said one stage (I) are solidly interconnected with the input shaft (in), a connecting shaft E mounting said planet carrier (s), the two sun gears (1, 1') being solidly interconnected to the second shaft, the planet carrier (s) of said one stage (I) being solidly interconnected with said one connecting shaft (E), and the ring gear (2') of said other stage (II) being solidly interconnected to said remaining connecting shaft (A).

3. An infinitely variable hydrostatic mechanical power shift gear as described in claim 1 in which the four-shaft epicyclic gear includes three connected planetary stages, wherein a first stage (I) includes a sun gear (1), a ring gear (2), a planet carrier (s) with planet gears (p), a second stage (II) includes a sun gear (1'), a ring gear (2'), a planet carrier (s') with planet gears (p'), and a third stage (III) includes a sun gear (1''), a ring gear (2''), a planet carrier (s'') with planet gears (p''), the planet carrier (s) of the first stage (I) being connected to the ring gear (2') of the second stage (II) and to the ring gear (2'') of the third stage (III), the sun gear (1) of the first stage (I) being connected to the planet carrier (s') of the second stage (II) and to the sun gear (1'') of the third stage (III), the planet carrier (s) of the first stage (I), the ring gear (2') of the second stage (II) and the ring gear (2") of the third stage (III) are solidly interconnected with the input shaft (in), the sun gear (1') of the second stage (II) is solidly interconnected with the second shaft, the planet carrier (s") of the third stage (III) is solidly interconnected with said one connecting shaft (E), and the ring gear (2) of the first stage (I) is solidly interconnected with said other connecting shaft (A).

4. An infinitely variable hydrostatic mechanical power shift gear as described in claim 1 in which the four-shaft epicyclic gear includes three connected planetary stages, wherein a first stage (I) includes a sun gear (1), a ring gear (2), a planet carrier (s) with planet gears (p), a second stage (II) includes a sun gear (1'), a ring gear (2'), a planet carrier (s') with planet gears (p'), and a third stage (III) includes a sun gear (1"), a ring gear (2"), a planet carrier (s") with planet gears (p"), the ring gear (2) of the first stage (I) being connected to the ring gear (2') of the second stage (II), the planet carrier (s') of the second stage (II) being connected to the planet carrier (s") of the third stage (III), and the sun gear (1) of the first stage (I) being connected to the sun gear (1") of the third stage (III), the ring gear (2) of the first stage (I) and the ring gear (2') of the second stage (II) are solidly interconnected with the input shaft (in), the sun gear (1) of the first stage (I) and the sun gear (1") of the third stage (III) are solidly interconnected with the second shaft, the planet carrier (s') of the second stage (II) and the planet carrier (s") of the third stage (III) are solidly interconnected with said one connecting shaft (E), and the ring gear (2") of the third stage (III) is solidly interconnected with said other connecting shaft (A).

5. An infinitely variable hydrostatic mechanical power shift gear as described in claim 1 in which a gear of the gear group and one of the group shiftings have transmission ratios which are reciprocal to each other and in which the shaft mounting the gear concerned of the selected gear group can be connected by means of a shifting clutch directly to the output shaft (out).

6. An infinitely variable hydrostatic mechanical power shift gear as described in claim 1 in which both connecting shafts are on the same side of the epicyclic gear (out) and in which the same gears are used for the first gear and second gear of the gear group.

7. An infinitely variably hydrostatic mechanical power shift gear as described in claim 1 in which the final gear of the gear group is a direct gear and in which the other gears of the gear group are taken back to this final gear via a spur gear stage (26, 27) and in which an additional planetary stage (III) including a sun gear (28), a ring gear (29), a planet carrier (30) with planet gears (31), forms the two group shiftings, wherein the planet carrier shaft (30) is solidly interconnected with the output shaft (out), the first group shifting is operative when the ring gear (29) of the additional stage (III) is connected via a shifting clutch (S5) to a housing (0), and in which the second countershaft (19) drives the sun gear (28) of the additional stage (III), the second group shifting is operative when the planet carrier shaft (30) of the additional stage (III) is driven as the output shaft (out) via shifting clutches, in which case the ring gear (29) of the additional stage (III) has to be disengaged.

8. An infinitely variable hydrostatic mechanical power shift gear as described in claim 1 in which displacers (a, b) of the hydrostatic gear can be connected via shifting clutches (S8, S9) to the gear wheels (5, 4) and in which one of the gear wheels (4) for the connection of one of the displacers (b) can be connected to a housing (0) via a shifting clutch (S10) when it is at a standstill.

9. An infinitely variable hydrostatic mechanical power shift gear as described in claim 1 in which the first countershaft (18) parallel to a central gear line is part of a two-countershaft or multi-countershaft design which is arranged evenly around the central gear line.

10. An infinitely variable hydrostatic mechanical power shift gear as described in claim 1 in which a shifting clutch (S11) can interrupt the input shaft (in) and connect the part of the input shaft on one side of the epicyclic gear to a gear housing (0), the other part of the input shaft drives a displacer (a) of the hydrostatic gear via the first gear wheels (6, 5).

11. An infinitely variable hydrostatic mechanical power shift gear comprising a four shaft epicyclic gear, an infinitely variable hydrostatic gear and gear pairs as defined in claim 1, said gear pairs being arranged in a first gear group and a second gear group wherein for the gears of the first gear group there is a first countershaft (19) and there is a second countershaft (18), the first and second countershafts being connectable by shifting clutch means for engaging selected ones of the third and fourth shafts of the epicyclic gear, a final output shaft and clutch means on said final output shaft for alternately connecting said final output shaft to one of said first and second countershafts.

12. An infinitely variable hydrostatic mechanical power gear shift, said shift having a four-shaft epicyclic gear means having at least two planetary stages, one shaft of which is an input shaft and a second shaft thereof being a first output shaft, said input and first output shafts being operatively connected by hydraulic means reactive to differentiation between the speeds of said input and first output shafts, the remaining ones of said four shafts being the second and third output shafts, one stage of said epicyclic gear means being connected to said second output shaft A and a second stage of said epicyclic gear means being connected to said third output shaft E, said power gear shift having fourth and fifth output shafts 19 and 18, said second and third output shaft A and E being selectively connectable to said fourth and fifth output shafts by first and second shifting clutches, said shafts A and E being alternately connectable to said fifth power output shaft by third and fourth shifting clutches whereby power can be continuously transmitted through said gear shift transmission without interruption as the path of such power transmission is shifted from one gear grouping to another during either acceleration or deceleration.

13. An infinitely variable hydrostatic mechanical gear shift power transmission comprising: a four shaft epicyclic gear having at least two interconnected planetary stages, of said four shafts, the first and second shafts being aligned and the third and fourth also being aligned and telescoped over said first and second shafts respectively, said first shaft being connected to the input for said transmission, an infinitely variable hydrostatic gear (a, b), said first and second shafts being interconnected through said hydrostatic gear, a fifth shaft and a sixth shaft, said fifth and sixth shafts having a common axis, a plurality of gear couples with one gear of each couple fixed to one of said fifth or sixth shafts and the other gear of each of said couples being mounted on one of said third or fourth shafts, a pair of interconnected gears secured to said sixth shaft and rotatable about the axis of said fifth shaft and clutch means for selectively connecting said pair of interconnected gears to said fifth shaft, one of said pair of interconnected gears being meshed to an output gear rotatably mounted on said fourth shaft and a clutch for selectively connecting said output gear to said fourth shaft, an output shaft having a pair of final output gears rotatably mounted thereon, one of said final output gears being meshed with the other gear of said interconnected gears and the other of said final output gears being meshed to an output gear on said fifth shaft, output clutch means for selectively connecting each of said one or the other of said final output gears to said output shaft for determining the transmission path of power to said output shaft.

14. An infinitely variable hydrostatic mechanical gear shift power transmission comprising: a four shaft epicyclic gear having at least two interconnected planetary stages, all four of said shafts being aligned about a common axis with certain ones of said shafts being telescopically related to others of said shafts, said first shaft being connected to the input for said transmission, other of said shafts being output shafts, an infinitely variable hydrostatic gear (a, b) connected to said epicyclic gear for governing the relative speeds of the output shafts of said epicyclic gear whereby the relative speeds of said shafts can vary from one of identity to one in which as the speed of one shaft decreases the speed of the other shaft increases, a fifth shaft and a sixth shaft, said fifth and sixth shafts having a common axis and a plurality of gear couples with one gear of each couple fixed to said fifth shaft and the other gear of each of said couples being mounted on one of the third or fourth shafts, a pair of gears rotatably mounted on said sixth shaft and a pair of clutch means for selectively connecting one of the gears of said pair of gears either to said fifth shaft or to said fourth shaft through a gear thereon; an output shaft having a pair of output receiving gears rotatably mounted thereon, one of said output gears being meshed with the other gear of said pair of gears and the other of said output receiving gears being meshed to an output gear on said fifth shaft, output clutch means for selectively connecting each of said one or the other of said output gears to said output shaft.

15. An infinitely variable hydrostatic mechanical gear shift power transmission comprising: a four shaft epicyclic gear having at least two interconnected planetary stages, all four of said shafts being arranged about a common axis, an infinitely variable hydrostatic gear (a, b) connected to said first shaft and to an output shaft of said epicyclic gear for governing the relative speeds of said shafts with respect to each other, said first shaft being the input for said transmission and connected to said epicyclic gear, a plurality of gears mounted on each of said third and fourth shafts, a fifth shaft and a sixth shaft, said fifth and sixth shafts having a common axis and a plurality of gears each coupled to a gear one of said third or fourth shafts, first output drive gears mounted on said fifth shaft, second output drive gears mounted on said sixth shaft, an output receiving shaft having a pair of output receiving gears mounted thereon, each of said output receiving gears being meshed with a different one of said output drive gears, output clutch means for selectively connecting one or the other of said output receiving gears to said output receiving shaft.

16. An infinitely variable hydrostatic mechanical gear shift power transmission comprising: a four shaft epicyclic gear having at least two interconnected planetary stages, all four of said shafts being aligned about a common axis one of said shafts being an input shaft and connected to one of said planetary stages, a second one of said shafts being connected to the sun gears of both of said planetary stages, the remaining ones of said four shafts being output shafts for said epicyclic gear, an infinitely variable hydrostatic gear (a, b) connected to said sun gears for governing the relative speeds of said output shafts of said epicyclic gear, a fifth shaft and a sixth shaft, said fifth and sixth shafts having one gear of a plurality of gear couples fixed thereto and the other gear of each of said gear couples being mounted on one of said third or fourth shafts, first clutch means for connecting said third and fifth shafts through selected ones of said gear couples and second clutch means for connecting said fourth and sixth shafts through selected one or the other of said gear couples, a pair of output gears one on each of said fifth and sixth shafts, and an output shaft having a pair of output receiving gears mounted thereon, one of said output gears being meshed with one of said output receiving gears and the other with the other of said output receiving gears, clutch means for selectively connecting said one or the other of said output and output receiving gears.

* * * * *

UNITED STATES PATENT AND TRADEMARK OFFICE
CERTIFICATE OF CORRECTION

PATENT NO. : 5,011,463
DATED : April 30, 1991
INVENTOR(S) : Friedrich Jarchow & Peter Tenberge It is certified that error appears in the above-identified patent and that said Letters Patent is hereby corrected as shown below:

Column 13, Table 6:
　　Under "Shifting Clutch"
　　　$S3^X$　　　$S5^X$
　　"Shaft Shaft　Shaft Wheel" should be
　　--Wheel Shaft　Housing Shaft--

Column 13, Table 5:
　　Under "Shifting Clutch"
　　　$S3^X$
　"Shaft Shaft" should be
　--Shaft Wheel--.

Column 17, line 47:
　　"variably" should be -- variable--.

Column 19, line 22:
　　"other" should be --others--.

Signed and Sealed this

Sixth Day of April, 1993

Attest:

STEPHEN G. KUNIN

Attesting Officer　　　Acting Commissioner of Patents and Trademarks